United States Patent
Hilakos et al.

(10) Patent No.: US 12,221,343 B2
(45) Date of Patent: Feb. 11, 2025

(54) METHOD FOR REMOVING HEAVY METALS IN THE MANUFACTURE OF PHOSPHORIC ACID

(71) Applicant: JESA TECHNOLOGIES LLC, Lakeland, FL (US)

(72) Inventors: Stephen Wayne Hilakos, Lakeland, FL (US); Anis Lakhouaja, Lakeland, FL (US)

(73) Assignee: JESA TECHNOLOGIES LLC, Lakeland, FL (US)

( * ) Notice: Subject to any disclaimer, the term of this patent is extended or adjusted under 35 U.S.C. 154(b) by 0 days.

(21) Appl. No.: 17/794,915

(22) PCT Filed: Feb. 24, 2022

(86) PCT No.: PCT/US2022/017766
§ 371 (c)(1),
(2) Date: Sep. 1, 2022

(87) PCT Pub. No.: WO2022/182909
PCT Pub. Date: Sep. 1, 2022

(65) Prior Publication Data
US 2023/0365409 A1 Nov. 16, 2023

Related U.S. Application Data

(60) Provisional application No. 63/153,871, filed on Feb. 25, 2021.

(51) Int. Cl.
*C01B 25/222* (2006.01)
*C01B 25/237* (2006.01)

(52) U.S. Cl.
CPC ......... *C01B 25/222* (2013.01); *C01B 25/237* (2013.01)

(58) Field of Classification Search
None
See application file for complete search history.

(56) References Cited

U.S. PATENT DOCUMENTS

| | | | | |
|---|---|---|---|---|
| 3,784,678 A | * | 1/1974 | Beltz | ..................... C01B 25/462 423/321.1 |
| 4,452,768 A | * | 6/1984 | Gradl | ........................ C22B 3/24 423/100 |
| 4,986,970 A | | 1/1991 | Haraldsen | |
| 2019/0106324 A1 | | 4/2019 | Zhang et al. | |

FOREIGN PATENT DOCUMENTS

| | | |
|---|---|---|
| WO | 2021/035058 | 2/2021 |
| WO | 2021/255062 | 12/2021 |

OTHER PUBLICATIONS

International Search Report and Written Opinion as mailed May 13, 2022, and received in International Patent Application No. PCT/US2022/017766, filed Feb. 24, 2022, 14 pages.

* cited by examiner

*Primary Examiner* — Wayne A Langel
(74) *Attorney, Agent, or Firm* — Seed IP Law Group LLP

(57) ABSTRACT

Methods for removing heavy metals from a phosphoric acid solution produced in a wet process for manufacturing phosphoric acid, comprising treating the wet-process phosphoric acid solution with a small amount of a solid adsorbing material and a complex reagent to form a heavy metal complex-contaminated solid adsorbing material, and removing the contaminated solid adsorbing material to yield a treated phosphoric acid solution having a low heavy metal content.

30 Claims, 8 Drawing Sheets

*values displayed are approximate and may be about +/-25%

METHOD FOR REMOVING HEAVY METALS IN THE MANUFACTURE OF PHOSPHORIC ACID

BACKGROUND

Technical Field

This invention relates to methods for manufacturing phosphoric acid from a calcium- and heavy metal-containing phosphate ore and, more particularly, to methods of removing heavy metal from the phosphoric acid.

Description of the Related Art

Phosphate rock (phosphorite) is a marine sedimentary ore that contains about 18-40% (w/w) phosphorus pentoxide ($P_2O_5$). One well-known method of producing phosphoric acid ($H_3PO_4$)—commonly referred to as "wet process"—is to treat phosphate rock with sulfuric acid at high temperatures in a reactor. During this process, the phosphate rock is dried, crushed, and then continuously fed into the reactor along with sulfuric acid. In addition to the resulting slurry of crude phosphoric acid, calcium ions within the phosphate rock combine with sulfate and form calcium sulfate solids (phosphogypsum), which are then separated from the resulting solution by filtration. The resulting phosphoric acid is then clarified and concentrated to give commercial grade acid for a variety of industrial applications or converted into fertilizers. However, during the production of wet-process phosphoric acid, heavy metal impurities present as minerals in the phosphate rock (such as cadmium, arsenic, copper, lead and mercury) are dissolved and remain in the resulting phosphoric acid solution. These heavy metal impurities are considered toxic and must be either completely removed, or their levels reduced significantly, depending on the application of the phosphoric acid.

Numerous techniques have been considered and reported on in the art for removing heavy metal impurities from phosphoric acid, including precipitation, extraction, adsorption, co-crystallization and electrolysis techniques. For example, U.S. Pat. No. 4,511,541 discloses a method for selectively recovering (extracting) cadmium, molybdenum, zinc, nickel and other metal ions from phosphoric acid solutions. More specifically, it is taught that an aqueous solution of phosphoric acid can be treated with an organophosphine extractant in a water-immiscible organic solvent (such as kerosene) to precipitate the metal ions for subsequent separation by way of extraction. One problem with this method is that the metal ions form complexes in the aqueous phase (i.e., the phosphoric acid solution), thereby making removal difficult. Further, the solvent extraction step to remove the precipitated metal impurities renders the process very time-consuming and expensive, and only applicable in treating filtered or pre-purified phosphoric acid solutions.

European Patent No. 0 333 489 B1 describes a method of simultaneously using a thio-organophosphine reagent, a reducing agent and an adsorbent (either inherently present in or added to the phosphoric acid solution) to remove cadmium and copper from the phosphoric acid solution. Due to treatment with the reducing agent, small amounts of the thio-organophosphine reagents are required (compared to when the reduction step is not carried out).

PCT Patent Application Pub. No. WO 2004/083118 describes a precipitation technique to remove heavy metal impurities (such as cadmium, copper, lead, nickel, arsenic, manganese and mercury) by treating crude phosphoric acid (i.e., prior to calcium sulfate filtration) with water-soluble metal-precipitating compositions. The compositions can remain liquid in the phosphoric acid phase, thereby permitting dispersion in the acidic solution and enhancing capture of metal impurities therein. Further, the precipitates formed can be filtered in the absence of calcium sulfate, and no additional reagents (such as a reducing agent or absorbent agent) are required for metal removal. The applicant of WO 2004/083118, Cytec Technology Corp. (now owned by Solvay SA), has commercialized a series of heavy metal removal reagents. For example, Cytec/Solvay's ACCO-PHOS® 800 reagent is disclosed for application to the slurry of phosphoric acid before the filtration step of removing the generated calcium sulfate (and after the concentration step). The dosage of the reagent may be around 3 kg/ton of $P_2O_5$, where the dosage required is high because the solid concentration (mainly calcium sulfate) is high (about 30 to 35% (w/w)) when the reagent stream is introduced into the phosphoric acid solution. The cadmium ions in the acid solution form complexes with the reagents prior to calcium sulfate being removed in a subsequent filtration step. This process, however, results in the generation of large amounts of calcium sulfate contaminated with heavy metals such as cadmium, which is considered a hazardous waste. Further, this process is performed under high temperatures which, combined with the high reagent concentration, leads to decomposition of reagent.

Accordingly, there is a need in the art for improved techniques for removal of heavy metal impurities, such as cadmium, arsenic, or copper, from a wet-process phosphoric acid solution. The present invention fulfils this need and provides other advantages as evident from the following description.

BRIEF SUMMARY

In brief, methods are provided for removing heavy metals (M) such as cadmium (Cd), Arsenic (As), and Copper (Cu) from a phosphoric acid solution produced in a wet process for manufacturing phosphoric acid. The methods comprise treating the wet-process phosphoric acid solution with a small amount of a solid adsorbing material and a complex reagent to form a heavy metal complex-contaminated solid adsorbing material, and then removing the contaminated solid adsorbing material to yield a treated phosphoric acid solution having a low heavy metal content.

In some embodiments, the invention provides a method for treating the wet-process phosphoric acid solution with a small amount of a solid adsorbing material and a complex reagent to form a cadmium complex-contaminated solid adsorbing material, and then removing the contaminated solid adsorbing material to yield a treated phosphoric acid solution having a low Cd content.

In some embodiments, the invention provides a method for treating the wet-process phosphoric acid solution with a small amount of a solid adsorbing material and a complex reagent to form an arsenic complex-contaminated solid adsorbing material, and then removing the contaminated solid adsorbing material to yield a treated phosphoric acid solution having a low As content.

In some embodiments, the invention provides a method for treating the wet-process phosphoric acid solution with a small amount of a solid adsorbing material and a complex reagent to form a copper complex-contaminated solid adsorbing material, and then removing the contaminated solid adsorbing material to yield a treated phosphoric acid solution having a low Cu content.

In some embodiments, the invention provides a method for manufacturing phosphoric acid from a calcium- and heavy metal-containing phosphate ore, comprising the steps of: (a) digesting the calcium- and heavy metal-containing phosphate ore with sulfuric acid to give an aqueous mixture of calcium sulfate, phosphoric acid, and heavy metal impurities, wherein the content of calcium sulfate in the aqueous mixture is from about 20 to about 40% (w/w); (b) removing the calcium sulfate from the aqueous mixture to give a wet-process phosphoric acid solution containing from about 20 to about 45% (w/w) $P_2O_5$ and having a pre-treated heavy metal content more than about 10 mg M/kg $P_2O_5$; (c) treating the wet-process phosphoric acid solution with from about 0.5 to about 10% (w/w) of a solid adsorbing material and from about 100 to about 5000 ppm (by weight on a 100% basis) of a complex reagent to form a heavy metal complex-contaminated solid adsorbing material, wherein the phosphoric acid solution is maintained during treatment at a temperature between 20-60° C., wherein the temperature is sufficient to allow treatment time to be up to about 180 minutes without significant decomposition of the heavy metal complex, and wherein the amount of complex reagent added is sufficient to lower the heavy metal content by at least about 10% at the temperature maintained; and (d) removing the heavy metal complex-contaminated solid adsorbing material from the phosphoric acid solution to yield a treated phosphoric acid solution having a post-treated heavy metal content at least about 10% lower than the pre-treated heavy metal content.

In some embodiments, the heavy metal is cadmium, arsenic, copper, or a combination thereof. In specific embodiments, the heavy metal is cadmium. In specific embodiments, the heavy metal is arsenic. In specific embodiments, the heavy metal is copper.

In certain embodiments, for the step (d) of the invention, the post-treated heavy metal content is at least about 20%, about 40%, about 60%, about 80%, about 90%, or about 95% lower than the pre-treated heavy metal content. In specific embodiments, for the step (d) of the invention, the post-treated heavy metal content is at least about 98% lower than the pre-treated heavy metal content. In more specific embodiments, the treated phosphoric acid solution contains less than about 20 mg M/kg $P_2O_5$, about 15 mg M/kg $P_2O_5$, about 10 mg M/kg $P_2O_5$, about 5 mg M/kg $P_2O_5$, or about 3 mg M/kg $P_2O_5$. In some embodiments, the treated phosphoric acid solution contains less than about 20 mg M/kg $P_2O_5$. In other embodiments, the treated phosphoric acid solution contains less than about 10 mg M/kg $P_2O_5$.

In certain embodiments, the invention further comprises a step (e), wherein the treated phosphoric acid solution of step (d) is recirculated in a heat exchange apparatus, and thereby used to cool the untreated wet-process phosphoric acid solution in step (c).

In certain embodiments, the solid adsorbing material used in the method of the invention is calcium sulfate, alumino-silicates, activated carbon, plastic resins, diatomaceous earth or perlite. In further embodiments, the solid adsorbing material is calcium sulfate.

In more specific embodiments, in the step (c) of the method of the invention, the wet-process phosphoric acid solution is treated with from about 0.5 to about 5% (w/w), from about 0.5 to about 2.5% (w/w), from about 0.5 to about 1% (w/w), or from about 0.5 to about 0.75% (w/w), of the solid adsorbing material.

In some embodiments, the complex reagent used in the method of the invention has the following structure of formula (I):

wherein
Q is a bond or O;
$R_1$ and $R_2$ are independently H, or a linear or branched $C_{1-4}$alkyl, wherein at least one of $R_1$ and $R_2$ is not H; and
X is H, an alkali metal or ammonium.

In other embodiments, the complex reagent used in the method of the invention has the following structure of formula (II):

wherein
Q is a bond or O;
$R_1$ is a linear or branched $C_{1-4}$ alkyl; and
X is H, an alkali metal or ammonium.

In more specific embodiments, in the step (c) of the method of the invention, the wet-process phosphoric acid solution is treated with from about 150 to about 750 ppm, from about 150 to about 500 ppm, or from about 150 to about 250 ppm, from about 175 to about 300 ppm, from about 200 to about 300 ppm, from about 250 to about 500 ppm, or from about 300 to about 500 ppm, of the complex reagent.

The invention thus provides a relatively simple and effective way to minimize the heavy metal-contaminated waste products (i.e., the resulting waste cakes).

DETAILED DESCRIPTION

Definitions

Figure 1A:
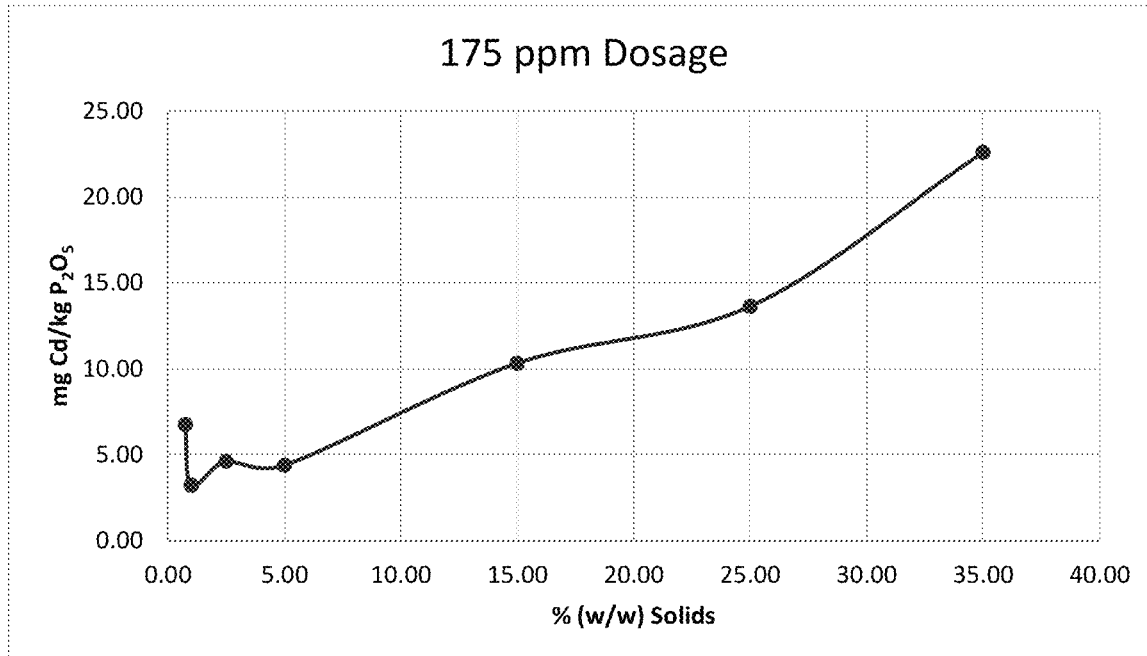
FIGS. 1A and 1B show, respectively, plots of the weight of Cadmium (Cd) removed (mg Cd/kg $P_2O_5$) versus various amounts of a solid adsorbing material added (% (w/w)) in an exemplary experiment of the present invention.

Unless the context requires otherwise, throughout this specification and claims, the words "comprise," "comprising" and the like are to be construed in an open, inclusive sense; the words "a," "an," and the like are to be considered as meaning at least one and are not limited to just one. Terms not specifically defined herein should be given the meanings that would be given to them by one of skill in the art in light of the disclosure and the context.

Reference to a value being "about" a given number means that the value is within a range of plus-or-minus (±) 25% of the number specified. For example, reference to "about 100 ppm" includes from plus 25% to minus 25% of this number, or from 75-125 ppm. Similar calculations may be made for all other values or ranges provided herein when proceeded by the term "about". In more specific embodiments, about refers to a range that is ±20% of the number specified, ±15% of the number specified, ±10% of the number specified, ±5% of the number specified, ±2% of the number specified, or ±1% of the number specified.

"Calcium- and heavy metal (M)-containing phosphate or" refers to phosphorite contains, for example, about 65 to 87% (w/w) bone phosphate of lime (BPL), namely $Ca_3(PO_4)_2$, and more than about 10 mg M/kg $P_2O_5$.

"Calcium- and cadmium-containing phosphate ore" refers to phosphorite contains, for example, about 65 to 87% (w/w) bone phosphate of lime (BPL), namely $Ca_3(PO_4)_2$, and more than about 10 mg Cd/kg $P_2O_5$. Cadmium contents vary considerably in rocks from different mining sites, for example, about 40 mg Cd/kg $P_2O_5$ in rocks from Florida, about 140 mg Cd/kg $P_2O_5$ in rocks from North Carolina, up to about 500 mg Cd/kg $P_2O_5$ in rocks from Western US, and about 40 to 100 mg Cd/kg $P_2O_5$ in rocks from North and West Africa. In the context of the invention, "cadmium-containing phosphate ore" means the phosphorite having a Cd content greater than the desirable value, which may depend on any applicable regulatory acceptable limit on Cd content in an intended final product. There are different phosphate rock quality requirements for different processes of producing phosphoric acid. In the invention described herein, the phosphate ore is the phosphorite suitable for production of phosphoric acid by way of the wet process. The phosphate ore may contain one or more heavy metals other than cadmium, such as copper, lead, nickel, arsenic, manganese, or mercury.

"Wet-process phosphoric acid solution" refers to the mixture obtained after the steps of digesting the calcium- and heavy metal-containing phosphate ore with sulfuric acid and then separating out the precipitated calcium sulfate. In the invention described herein, the wet-process phosphoric acid solution is a solution that contains about 20 to 45% (w/w) $P_2O_5$ and has a pre-treated heavy metal (M) content more than about 10 mg M/kg $P_2O_5$. In some embodiments, the wet-process phosphoric acid solution is substantially free of the precipitated calcium sulfate.

"Pre-treated heavy metal content" refers to the original or initial heavy metal content in the wet-process phosphoric acid solution resulted from the step (b) of the method of the invention (i.e., the phosphoric acid solution prior to the treatment by the complex reagent and the solid adsorbing material). In the invention described herein, the pre-treated heavy metal (M) content refers to a content more than about 10 mg M/kg $P_2O_5$.

"Complex reagent" refers to a reagent that can form a complex with a heavy metal (such as cadmium, copper, lead, nickel, arsenic, manganese, and mercury) and facilitate adsorption or adherence of the heavy metal impurities onto a solid adsorbing material. For example, the reagent may be a di-lower alkyl dithiophosphinate, di-lower alkyl dithiophosphate, lower alkyl dithioate, or lower alkyl xanthate. In some embodiments, the lower alkyl substituent is a linear or branched $C_{1-4}$ alkyl. For example, the complex reagent is an ammonium, sodium, or potassium salt of di-isobutyl dithiophosphate, di-isobutyl dithiophosphinate, 2-methylpropanedithioate, or isobutyl xanthate. When the carbon chain is prolonged (e.g., the carbon number is 5 or more), the reagent tends to precipitate in the acidic solution. In some embodiments of the invention, the complex reagent may form an oil layer on the surface of the solid adsorbing material, thereby facilitating the capture of the heavy metals, such as cadmium or arsenic.

"Adsorption," "adsorbing," or "adsorb" refers to adherence of heavy metal ions, molecules or complexes onto the surface of another substance referred to herein as a "solid adsorbing material." In the invention described herein, the complex of heavy metal and the complex reagent is preferentially adsorbed onto the solid adsorbing material (e.g. calcium sulfate).

"Solid adsorbing material" refers to a material providing surfaces to allow heavy metal ions, molecules or complexes to adhere thereon, which also provides good filterability, i.e., easy to be filtered out. For example, the solid adsorbing material is calcium sulfate, aluminosilicates, activated carbon, plastic resins, diatomaceous earth (DE), perlite, or other materials that provide large amounts of surface area. In some embodiments of the invention, the solid adsorbing material may be the calcium sulfate recycled from the waste cake generated in the process of manufacturing phosphoric acid.

"Heavy metal complex-contaminated solid adsorbing material" refers to the solid material resulted from treating the wet-process phosphoric acid solution with the solid adsorbing material and the complex reagent. Without being bound by theory, it is believed that the complex reagent can form a complex with a heavy metal and adhere onto the surface of the solid adsorbing material. In the invention described herein, the term "contaminated solid adsorbing material" can be simply understood as a complex of the complex reagent, the heavy metal impurity (e.g., cadmium, arsenic, copper, and the like), and the solid adsorbing material.

"Treatment time" refers to the time the wet-process phosphoric acid solution with the solid adsorbing material is exposed to the complex reagent. Common synonyms for treatment time are well known in the industry and may be referred to as "exposure time" or "residence time."

"Treated phosphoric acid solution" refers to the solution resulted from treating the wet-process phosphoric acid solution with the solid adsorbing material and the complex reagent, and then removing the contaminated solid adsorbing material. In the invention described herein, the treated phosphoric acid solution means a phosphoric acid solution with a significantly lower heavy metal (M) content as compared to its pre-treated status, and substantially free of solid particles.

"Post-treated heavy metal content" refers to the resulting heavy metal content in the treated phosphoric acid solution. In the invention described herein, the post-treated heavy metal content is at least about 10% lower than the pre-treated heavy metal content. To illustrate, for example, when the pre-treated heavy metal content is about 40 mg M/kg $P_2O_5$, the post-treated heavy metal content is less than about 36 mg M/kg $P_2O_5$ (40−40*10%=36).

"Cadmium" or "Cd" is used at times in reference to an elemental or metallic state in the form in which it appears in, for example, ore, wet-process phosphoric acid solution, recycled solution, and waste cake. Where not explicitly stated, those skilled in the art are expected to appreciate the context. Unless otherwise specified, cadmium may be in its naturally occurring valence state, e.g., $Cd^{2+}$.

"Cleaning solvent" means a solvent capable of removing the complex reagent and M from the heavy metal complex-contaminated calcium sulfate. In some embodiments, the cleaning solvent is kerosene or methanol, or other alcohols or hydrocarbons.

"Dosage rate" means the content of the complex reagent used in the method of the invention, calculated in ppm.

Throughout this document, quantities expressed in ppm are all made on a weight basis.

As mentioned above, the invention provides a method comprising treating a wet-process phosphoric acid solution with a small amount of a solid adsorbing material and a complex reagent to form a heavy metal (M) complex-contaminated solid adsorbing material, and then removing the contaminated solid adsorbing material to yield a treated phosphoric acid solution having a low M content. It has been found that when employing a lower amount of the solid adsorbing material, the M removal efficiency by the complex reagent can be significantly improved. Further, using the lower amount of the solid adsorbing material can lead to less hazardous waste produced in the process of manufacturing phosphoric acid, i.e., less amounts of the M-contaminated waste cakes.

Accordingly, in some embodiments, the invention provides a method for manufacturing phosphoric acid from a calcium- and heavy metal-containing phosphate ore, comprising the steps of: (a) digesting the calcium- and heavy metal-containing phosphate ore with sulfuric acid to give an aqueous mixture of calcium sulfate, phosphoric acid, and heavy metal impurities, wherein the content of calcium sulfate in the aqueous mixture is from about 20 to about 40% (w/w); (b) removing the calcium sulfate from the aqueous mixture to give a wet-process phosphoric acid solution containing from about 20 to about 45% (w/w) $P_2O_5$ and having a pre-treated heavy metal content more than about 10 mg M/kg $P_2O_5$; (c) treating the wet-process phosphoric acid solution with from about 0.5 to about 10% (w/w) of a solid adsorbing material and from about 100 to about 5000 ppm (by weight on a 100% basis) of a complex reagent to form a heavy metal complex-contaminated solid adsorbing material, wherein the phosphoric acid solution is maintained during treatment at a temperature between 20-60° C., wherein the temperature is sufficient to allow treatment time to be up to about 180 minutes without significant decomposition of the heavy metal complex, and wherein the amount of complex reagent added is sufficient to lower the heavy metal content by at least about 10% at the temperature maintained; and (d) removing the heavy metal complex-contaminated solid adsorbing material from the phosphoric acid solution to yield a treated phosphoric acid solution having a post-treated heavy metal content at least about 10% lower than the pre-treated heavy metal content.

In some embodiments, the heavy metal is cadmium, arsenic, copper, or a combination. In specific embodiments, the heavy metal is cadmium. In specific embodiments, the heavy metal is arsenic. In specific embodiments, the heavy metal is copper.

In certain embodiments, the invention further comprises a step (e), wherein the treated phosphoric acid solution of step (d) is recirculated in a heat exchange apparatus, and thereby used to cool the untreated wet-process phosphoric acid solution in step (c).

In certain embodiments of the invention, the workflow beginning in step (c) comprises the steps of: (1) cooling of the wet-process phosphoric acid solution of step (b) to the desired temperature between about 20-60° C. in a heat exchanging apparatus; (2) introducing a complex reagent to form a heavy metal complex-contaminated solid adsorbing material, wherein the solid adsorbing material is either inherently present in or added to the phosphoric acid solution; (3) filtering of the wet-process phosphoric acid solution containing the heavy metal (e.g., Cd, As, Cu and the like) complex-contaminated solid adsorbing material, wherein the time it takes to pass substantially all of the wet-process phosphoric acid solution containing the heavy metal complex-contaminated solid adsorbing material through the filter is the treatment time; (4) recovery of the treated phosphoric acid solution of step (d), which is then used in step (e) to cool the feed of the incoming wet-process phosphoric acid solution of step (b), wherein the heat exchange advantageously reheats the phosphoric acid solution of step (d), wherein the phosphoric acid solution of step (d) may then be concentrated; and (4bis) recovery of the heavy metal-contaminated gypsum collected on the filter during step (3).

Figure 8:
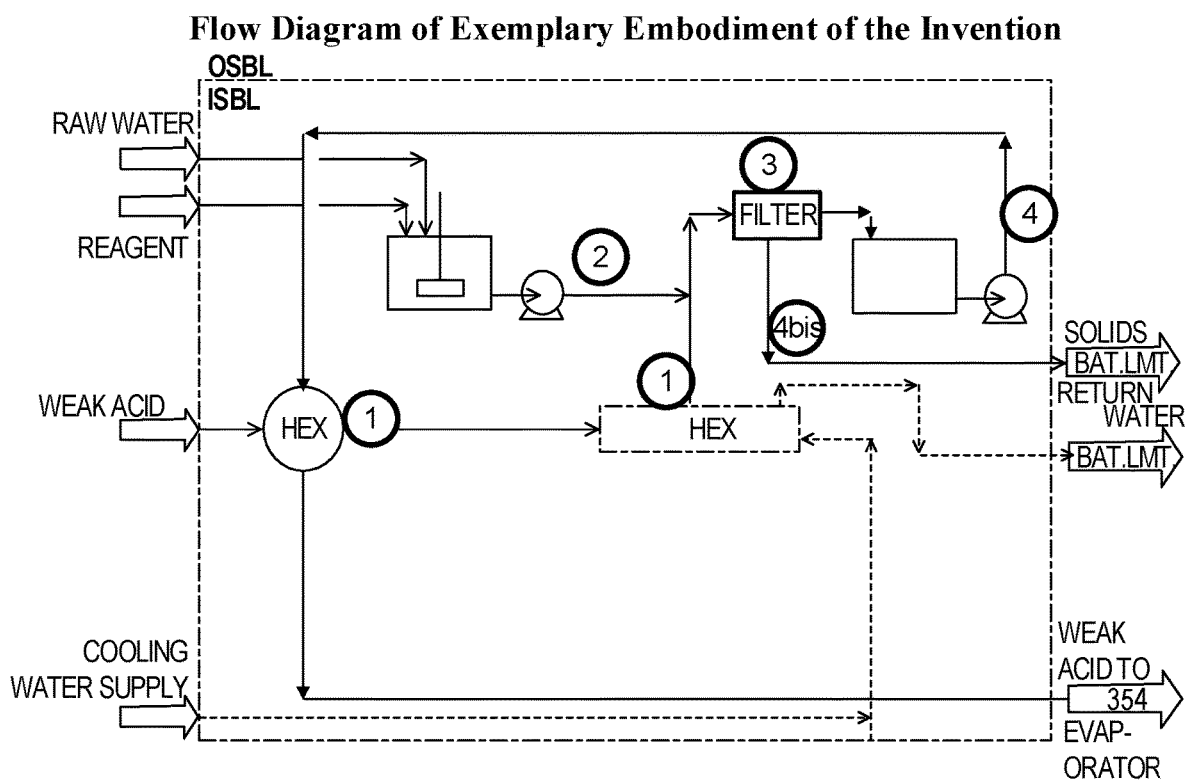
FIG. 8 depicts a specific exemplary embodiment of the invention wherein, the workflow beginning in step (c) comprises the steps of: (1) cooling of the wet-process phosphoric acid solution of step (b) to the desired temperature between about 20-60° C.; (2) injection of a complex reagent; (3) acid filtering; (4) recovery of treated acid, which is used to cool the incoming wet-process phosphoric acid solution of step (b) via a heat exchange apparatus; and (4bis) recovery of heavy metal contaminated gypsum (wherein step (1) optionally comprises a second heat exchange apparatus).

In a specific embodiment of the invention, the workflow of steps (1)-(4bis) as described above additionally includes a second heat exchange apparatus in step (1). In specific embodiments of the invention, the second heat exchange apparatus employs a cooling water supply (see e.g., FIG. 8). In a more specific embodiment of the invention, either or both of the heat exchange apparatuses is a spiral heat exchange apparatus.

In certain embodiments of the invention, the workflow beginning in step (c) comprises the steps of: (1) cooling of the wet-process phosphoric acid solution of step (b) to the desired temperature between about 20-60° C. in a heat exchanging apparatus; (2) introducing a complex reagent to form a cadmium complex-contaminated solid adsorbing material, wherein the solid adsorbing material is either inherently present in or added to the phosphoric acid solution; (3) filtering of the wet-process phosphoric acid solution containing the cadmium complex-contaminated solid adsorbing material, wherein the time it takes to pass substantially all of the wet-process phosphoric acid solution containing the cadmium complex-contaminated solid adsorbing material through the filter is the treatment time; (4) recovery of the treated phosphoric acid solution of step (d), which is then used in step (e) to cool the feed of the incoming wet-process phosphoric acid solution of step (b), wherein the heat exchange advantageously reheats the phosphoric acid solution of step (d), wherein the phosphoric acid solution of step (d) may then be concentrated; and (4bis) recovery of the cadmium-contaminated gypsum collected on the filter during step (3).

In certain embodiments, for the step (d) of the invention, the post-treated heavy metal content is at least about 20%, about 40%, about 60%, about 80%, about 90%, or about 95% lower than the pre-treated heavy metal content. In specific embodiments, for the step (d) of the invention, the post-treated heavy metal content is at least about 98% lower than the pre-treated heavy metal content. In more specific embodiments, the treated phosphoric acid solution contains less than about 20 mg M/kg $P_2O_5$, about 15 mg M/kg $P_2O_5$, about 10 mg M/kg $P_2O_5$, about 5 mg M/kg $P_2O_5$, or about 3 mg M/kg $P_2O_5$. In some embodiments, the treated phosphoric acid solution contains less than about 20 mg M/kg $P_2O_5$. In other embodiments, the treated phosphoric acid solution contains less than about 10 mg M/kg $P_2O_5$.

In other embodiments, in the step (c) of the invention, all of the steps are performed at about 20-60° C., about 20-50° C., about 20-40° C., about 25-35° C., about 20-30° C., or about ambient room temperature. The treatment time may be adjusted based on the temperature. When the temperature is lower, treatment time may be prolonged. Without being bound by theory, it is believed that the complex of the complex reagent and the heavy metal impurity (e.g., cadmium, arsenic, or copper), with or without adhering to the solid adsorbing material, breaks down at higher temperatures such that prolonged treatment time has the effect of releasing the heavy metal impurity back into the solution.

In some embodiments, in the step (c) of the invention, all of the steps are performed at about 20-50° C. In other embodiments, in the step (c) of the invention, all of the steps are performed at about 20-40° C. In other embodiments, in the step (c) of the invention, all of the steps are performed at about 25-40° C. In other embodiments, in the step (c) of the invention, all of the steps are performed at about 25-35° C. In other embodiments, in the step (c) of the invention, all of the steps are performed at about 20-30° C.

In some embodiments, in the step (c) of the invention, the wet-process phosphoric acid solution is treated with the solid adsorbing material and the complex reagent for at most about 120 minutes. In some embodiments, in the step (c) of the invention, the wet-process phosphoric acid solution is treated with the solid adsorbing material and the complex reagent for at most about 90 minutes. In some embodiments, in the step (c) of the invention, the wet-process phosphoric acid solution is treated with the solid adsorbing material and the complex reagent for at most about 60 minutes. In some embodiments, in the step (c) of the invention, the wet-process phosphoric acid solution is treated with the solid adsorbing material and the complex reagent for at most about 50 minutes. In some embodiments, in the step (c) of the invention, the wet-process phosphoric acid solution is treated with the solid adsorbing material and the complex reagent for at most about 40 minutes. In some embodiments, in the step (c) of the invention, the wet-process phosphoric acid solution is treated with the solid adsorbing material and the complex reagent for at most about 30 minutes. In other embodiments, in the step (c) of the invention, the wet-process phosphoric acid solution is treated with the solid adsorbing material and the complex reagent for at most about 20 minutes. In other embodiments, in the step (c) of the invention, the wet-process phosphoric acid solution is treated with the solid adsorbing material and the complex reagent for at most about 10 minutes.

In some embodiments, for the step (c) of the invention, the wet-process phosphoric acid solution is treated with the solid adsorbing material and the complex reagent for a period of time as short as about 3 seconds, about 10 seconds, about 0.5 to 5 minutes, about 1 to 3 minutes, or about 3 minutes.

In specific embodiments, in the step (c) of the invention, the wet-process phosphoric acid solution is maintained at about 20-60° C. and treated for between about 0.05-120 minutes. In some embodiments, in the step (c) of the invention, the wet-process phosphoric acid solution is maintained at about 20-60° C. and treated for between about 0.05-90 minutes. In specific embodiments, in the step (c) of the invention, the wet-process phosphoric acid solution is maintained at about 20-60° C. and treated for between about 0.05-60 minutes. In specific embodiments, in the step (c) of the invention, the wet-process phosphoric acid solution is maintained at about 20-60° C. and treated for between about 0.05-45 minutes. In specific embodiments, in the step (c) of the invention, the wet-process phosphoric acid solution is maintained at about 20-60° C. and treated for between about 0.05-30 minutes.

In some embodiments, in the step (c) of the invention, the wet-process phosphoric acid solution is maintained at about 20-30° C. and treated for between about 0.05-90 minutes. In specific embodiments, in the step (c) of the invention, the wet-process phosphoric acid solution is maintained at about 20-30° C. and treated for between about 0.05-60 minutes. In specific embodiments, in the step (c) of the invention, the wet-process phosphoric acid solution is maintained at about 20-30° C. and treated for between about 0.05-45 minutes. In specific embodiments, in the step (c) of the invention, the wet-process phosphoric acid solution is maintained at about 20-30° C. and treated for between about 0.05-30 minutes.

In some embodiments, in the step (c) of the invention, the wet-process phosphoric acid solution is maintained at about 30-40° C. and treated for between about 0.05-90 minutes. In specific embodiments, in the step (c) of the invention, the wet-process phosphoric acid solution is maintained at about 30-40° C. and treated for between about 0.05-60 minutes. In specific embodiments, in the step (c) of the invention, the wet-process phosphoric acid solution is maintained at about 30-40° C. and treated for between about 0.05-45 minutes. In specific embodiments, in the step (c) of the invention, the wet-process phosphoric acid solution is maintained at about 30-40° C. and treated for between about 0.05-30 minutes.

In some embodiments, in the step (c) of the invention, the wet-process phosphoric acid solution is maintained at about 40-50° C. and treated for between about 0.05-60 minutes. In specific embodiments, in the step (c) of the invention, the wet-process phosphoric acid solution is maintained at about 40-50° C. and treated for between about 0.05-45 minutes. In specific embodiments, in the step (c) of the invention, the wet-process phosphoric acid solution is maintained at about 40-50° C. and treated for between about 0.05-30 minutes.

In some embodiments, in the step (c) of the invention, the wet-process phosphoric acid solution is maintained at about 50-60° C. and treated for between about 0.05-20 minutes. In specific embodiments, in the step (c) of the invention, the wet-process phosphoric acid solution is maintained at about 50-60° C. and treated for between about 0.05-10 minutes.

In some embodiments, in the step (c) of the invention, the phosphoric acid solution is maintained during treatment at a temperature between 20-60° C. and treated for at least about 0.05 to about 180 minutes, wherein the maximum treatment time (Y) is inversely proportional to the temperature (X) according to the formula $Y=0.12X^2-17X+600$, +/−35%, up to about 180 minutes. For example, when X is 40, $Y=0.12(40^2)-(17*40)+600$, which equals 112 (+/−39) minutes maximum treatment time.

In some embodiments, in the step (c) of the invention, all of the steps are performed at about 25-40° C. and the complex reagent is added at a dosage of about 100-2000 ppm. In some embodiments, in the step (c) of the invention, all of the steps are performed at about 25-40° C. and the complex reagent is added at a dosage of about 100-900 ppm. In some embodiments, in the step (c) of the invention, all of the steps are performed at about 25-40° C. and the complex reagent is added at a dosage of about 100-500 ppm. In some embodiments, in the step (c) of the invention, all of the steps are performed at about 25-40° C. and the complex reagent is added at a dosage of about 100-300 ppm.

In some embodiments, in the step (c) of the invention, all of the steps are performed at about 40-60° C. and the complex reagent is added at a dosage of about 100-2000 ppm. In some embodiments, in the step (c) of the invention, all of the steps are performed at about 40-60° C. and the complex reagent is added at a dosage of about 100-900 ppm. In some embodiments, in the step (c) of the invention, all of the steps are performed at about 40-60° C. and the complex reagent is added at a dosage of about 100-500 ppm.

In other more specific embodiments, the invention provides a method for manufacturing phosphoric acid from a calcium- and cadmium-containing phosphate ore, comprising the steps of: (a) digesting the calcium- and cadmium-containing phosphate ore with sulfuric acid to give an aqueous mixture of calcium sulfate, phosphoric acid, and cadmium impurities, wherein the content of calcium sulfate in the aqueous mixture is from about 20 to about 40% (w/w); (b) removing the calcium sulfate from the aqueous mixture to give a wet-process phosphoric acid solution containing from about 20 to about 45% (w/w) $P_2O_5$ and having a pre-treated cadmium content of about 50-90 mg Cd/kg $P_2O_5$; (c) treating the wet-process phosphoric acid solution with from about 0.5 to about 10% (w/w) of a solid adsorbing material and from about 100 to about 1500 ppm (by weight on a 100% basis) of a complex reagent, wherein the complex reagent is a di-lower alkyl dithiophosphinate salt or di-lower alkyl dithiophosphate salt, to form a cadmium complex-contaminated solid adsorbing material, wherein the phosphoric acid solution is maintained during treatment at a temperature between 20-60° C., such that about Y(ppm) of the reagent is added when the temperature of the phosphoric acid solution is about X(° C.) according to the formula $Y=((Z-50)*5)+0.55X^2-23.8X+388$, +/−35%; and (d) removing the cadmium complex-contaminated solid adsorbing material from the phosphoric acid solution to yield a treated phosphoric acid solution having a post-treated cadmium content at least about 10% lower than the pre-treated cadmium content. For example, when Z is 50 and X is 30, $Y=((50-50)*5)+0.55(30^2)-23.8(30)+388$, +/−35%, which equals 169 (+/−59) ppm of complex reagent added.

In some embodiments, in the step (c) of the invention, all of the steps are performed at about 25° C. and the complex reagent is added at a dosage of about 150 ppm. In other embodiments, in step (c) of the invention, all of the steps are performed at about 35° C. and the complex reagent is added at a dosage of about 260 ppm. In other embodiments, in step (c) of the invention, all of the steps are performed at about 40° C. and the complex reagent is added at a dosage of about 320 ppm. In other embodiments, in step (c) of the invention, all of the steps are performed at about 45° C. and the complex reagent is added at a dosage of about 440 ppm. In other embodiments, in step (c) of the invention, all of the steps are performed at about 50° C. and the complex reagent is added at a dosage of about 630 ppm. In other embodiments, in step (c) of the invention, all of the steps are performed at about 55° C. and the complex reagent is added at a dosage of about 770 ppm.

The amount of complex reagent added may be adjusted based on the temperature. When the temperature is lower, less of the complex reagent may be used. Without being bound by theory, it is believed that the complex of the complex reagent and the heavy metal impurity (e.g., cadmium, arsenic, or copper), with or without adhering to the solid adsorbing material, breaks down at higher temperatures such that higher temperatures have the effect of releasing the heavy metal impurity back into the solution.

In some embodiments, the method of the invention further comprises a step (f) of concentrating the treated phosphoric acid solution of step (d) to give a concentrated acid solution having from about 40% to about 54% (w/w) $P_2O_5$. For example, the concentration step (f) can be conducted by a conventional evaporation technique.

In some embodiments, the method of the invention further comprises a step (g) of collecting the calcium sulfate removed from the step (b), cleaning the collected calcium sulfate, and adding the cleaned calcium sulfate into the wet-process phosphoric acid solution of step (c) as the solid adsorbing material. In further embodiments of the step (g) of the invention, the cleaning step may be conducted by washing the collected calcium sulfate with water.

In certain embodiments, the method of the invention further comprises a step (h) of collecting the heavy metal complex-contaminated solid adsorbing material removed from the step (d), optionally cleaning the collected contaminated solid adsorbing material, and optionally adding the cleaned solid adsorbing material into the wet-process phosphoric acid solution of step (c) as the solid adsorbing material.

In other embodiments, the method of the invention further comprises a step (h) of collecting the heavy metal complex-contaminated solid adsorbing material removed from the step (d), cleaning the collected contaminated calcium sulfate, and adding the cleaned calcium sulfate into the wet-process phosphoric acid solution of step (c) as the solid adsorbing material.

In further embodiments of the step (h) of the invention, the optional cleaning step is conducted by washing the collected contaminated solid adsorbing material with a cleaning solvent to remove the complex reagent and heavy metal(s) from the contaminated solid adsorbing material. In specific embodiments, in step (h) the solid adsorbing material comprises calcium sulfate. In specific embodiments, in step (h) the solid adsorbing material substantially consists of calcium sulfate. In specific embodiments, in step (h) the heavy metal is recovered.

Accordingly, in more specific embodiments, the invention provides a method for manufacturing phosphoric acid from a calcium- and heavy metal-containing phosphate ore, comprising the steps of: (a) digesting the calcium- and heavy metal-containing phosphate ore with sulfuric acid to give an aqueous mixture of calcium sulfate, phosphoric acid, and heavy metal impurities, wherein the content of calcium sulfate in the aqueous mixture is from about 25 to about 40% (w/w); (b) removing the calcium sulfate from the aqueous mixture to give a wet-process phosphoric acid solution containing from about 20 to about 40% (w/w) $P_2O_5$ and having a pre-treated heavy metal content more than about 20 mg M/kg $P_2O_5$; (c) treating the wet-process phosphoric acid solution with from about 0.5 to about 5% (w/w) of a solid adsorbing material and from about 175 to about 500 ppm (by weight on a 100% basis) of a complex reagent to form a heavy metal complex-contaminated solid adsorbing material, wherein the phosphoric acid solution is maintained during treatment at a temperature between 20-60° C., wherein the temperature is sufficient to allow treatment time to be up to about 90 minutes without significant decomposition of the heavy metal complex, and wherein the amount of complex reagent added is sufficient to lower the heavy metal content by at least about 10% at the temperature maintained; and (d) removing the heavy metal complex-contaminated solid adsorbing material from the phosphoric acid solution to yield a treated phosphoric acid solution having a post-treated heavy metal content at least about 20% lower than the pre-treated heavy metal content.

In some embodiments, the complex reagent used in the method of the invention has the following structure of formula (I):

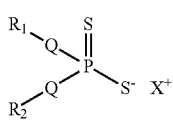

(I)

wherein Q is a bond or O; $R_1$ and $R_2$ are independently H, or a linear or branched $C_{1-4}$ alkyl, wherein at least one of $R_1$ and $R_2$ is not H; and X is H, an alkali metal or ammonium.

When Q is a bond, the complex reagent is a dithiophosphinate. When Q is O, the complex reagent is a dithiophosphate. In some embodiments, $R_1$ and $R_2$ are independently a linear $C_{1-4}$ alkyl, such as methyl, ethyl, n-propyl or n-butyl. In other embodiments, $R_1$ and $R_2$ are independently a branched $C_{1-4}$ alkyl, such as isopropyl or isobutyl. In some embodiments, $R_1$ is H and $R_2$ is a linear $C_{1-4}$ alkyl, such as methyl, ethyl, n-propyl or n-butyl. In other embodiments, $R_1$ is H and $R_2$ is a branched $C_{1-4}$ alkyl, such as isopropyl or isobutyl.

In some embodiments, X is an alkali metal, such as lithium, sodium, potassium, rubidium, caesium or francium. In other embodiments, X is ammonium.

In some embodiments, $R_1$ and $R_2$ are isobutyl and X is ammonium, sodium or potassium. For example, the complex reagent may be ammonium di-isobutyl dithiophosphate, ammonium di-isobutyl dithiophosphinate, sodium di-isobutyl dithiophosphate, sodium di-isobutyl dithiophosphinate, potassium di-isobutyl dithiophosphate, or potassium di-isobutyl dithiophosphinate. In other embodiments, $R_1$ is H and $R_2$ is isobutyl. For example, the complex reagent may be ammonium isobutyl dithiophosphate, ammonium isobutyl dithiophosphinate, sodium isobutyl dithiophosphate, sodium isobutyl dithiophosphinate, potassium isobutyl dithiophosphate, or potassium isobutyl dithiophosphinate.

In certain embodiments, the complex reagent used in the method of the invention is sodium di-isobutyl dithiophosphinate, sodium di-isobutyl dithiophosphates, or ammonium di-isobutyl dithiolphosphate, where the complex reagent may form an oil layer on the surface of the solid adsorbing material, thereby facilitating the capture of heavy metal(s) (e.g., cadmium, arsenic, or copper) from the phosphoric acid solution by the solid adsorbing material. In such instances, the oil layer may adhere to not only the solid adsorbing materials but also any equipment, tanks and pipe lines that it is exposed to. The lower solid content as used in the method of the invention will reduce the required amount of the complex reagent, thereby minimizing the hazardous effects that the reagent may impose upon people working in the plant.

In further embodiments, the complex reagent used in the method of the invention is an ammonium di-lower alkyl dithiophosphinate or dithiophosphate, such as ammonium di-isobutyl dithiophosphinate or ammonium di-isobutyl dithiophosphate. The ammonium salt of dithiophosphinate or dithiophosphate may remain in a dry solid form with no vapor pressure or odor and can dissolve easily in water. In contrast, the sodium salt of dithiophosphinate or dithiophosphate may form a high pH aqueous solution with strong odors and is normally sold at high concentrations (e.g., 50%). In some embodiments, it is advantageous for plant operators to handle the ammonium salts in solid form, as opposed to liquids. Further, the sodium salt of dithiophosphinate is a relatively expensive chemical, costing about four times that of the ammonium salt of dithiophosphate.

In some embodiments, the complex reagent used in the method of the invention has the following structure of formula (II):

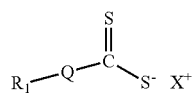

(II)

wherein Q is a bond or O; $R_1$ is a linear or branched $C_{1-8}$ alkyl; and X is H, an alkali metal or ammonium. In some embodiments, $R_1$ is $C_{1-4}$ alkyl When Q is a bond, the complex reagent is a dithioate. When Q is O, the complex reagent is a xanthate. In some embodiments, $R_1$ is a linear $C_{1-4}$ alkyl, such as methyl, ethyl, n-propyl or n-butyl. In other embodiments, $R_1$ is a branched $C_{1-4}$ alkyl, such as isopropyl or isobutyl. In some embodiments, X is an alkali metal, such as lithium, sodium, potassium, rubidium, caesium or francium. In other embodiments, X is ammonium.

In some embodiments, Q is O, $R_1$ is isobutyl and X is potassium or sodium. For example, the complex reagent may be potassium isobutyl xanthate or sodium isobutyl xanthate. In some embodiments, the complex reagent is sodium isobutyl xanthate. In some embodiments, Q is a bond, $R_1$ is isopropyl and X is potassium or sodium. For example, the complex reagent may be sodium 2-methylpropanedithioate, or potassium 2-methylpropanedithioate.

In certain embodiments, for the step (c) of the invention, the wet-process phosphoric acid solution is treated with from about 150 to about 5000 ppm, from about 150 to about 2500 ppm, or from about 150 to about 1500 ppm, from about 150 to about 1000 ppm, or from about 250 to about 900 ppm, of the complex reagent.

In certain embodiments, for the step (c) of the invention, the wet-process phosphoric acid solution is treated with from about 150 to about 750 ppm, from about 150 to about 500 ppm, or from about 150 to about 250 ppm, from about 175 to about 300 ppm, from about 200 to about 300 ppm, from about 250 to about 500 ppm, or from about 300 to about 500 ppm, of the complex reagent.

As shown in Table 3 and Table 4, it has been found that when the content of the complex reagent is controlled at about 150 ppm, the Cd removal rate can reach to at least about 10%. As the dosage rate of the complex reagent increases, the Cd removal rate also increases to about 20%, about 40%, about 60%, about 80%, about 90%, or about 95%. The dosage rate may be adjusted based on the pre-treated Cd content. When the pre-treated Cd content is greater, a higher dosage rate is used. Similar trends are seen for other heavy metals (e.g., arsenic and copper).

In some embodiments, the solid adsorbing material used in the method of the invention is calcium sulfate, alumino-silicates, activated carbon, plastic resins, diatomaceous earth, perlite, or any combination thereof. In further embodiments, the solid adsorbing material used in the method of the invention is calcium sulfate.

In certain embodiments, the filtration step (b) of the invention is conducted by reducing the calcium sulfate generated in the step (a) to give the wet-process phosphoric acid solution containing about 0.5 to 10% (w/w) of the precipitated calcium sulfate, i.e., reducing the calcium sulfate content from about 20-40% (w/w) to about 0.5-10% (w/w). In such instances, the remaining calcium sulfate serves as the solid adsorbing material used in the step (c), i.e., the wet-process phosphoric acid solution is treated with about 0.5 to about 10% (w/w) of the remaining calcium sulfate. In some embodiments, the filtration step (b) of the invention is conducted by reducing the calcium sulfate generated in the step (a) to give the wet-process phosphoric acid solution containing from about 0.5 to about 5% (w/w), from about 0.5 to about 2.5% (w/w), from about 0.5 to about 1% (w/w), or from about 0.5 to about 0.75% (w/w), of the remaining calcium sulfate.

Figure 1B:
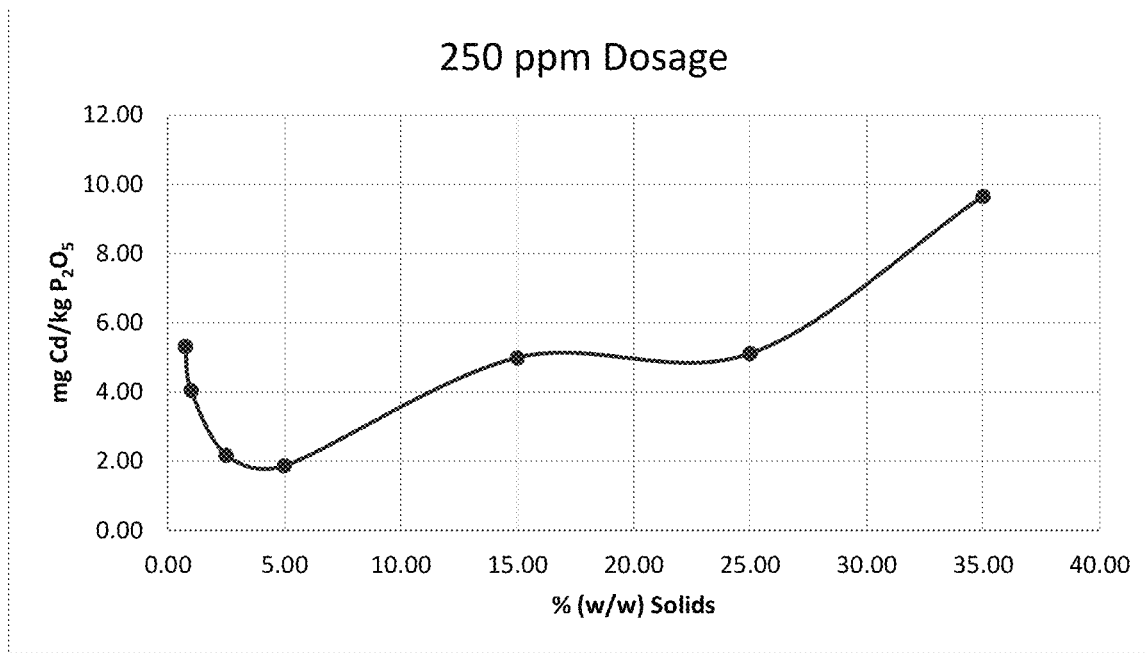

In some embodiments, for the step (c) of the invention, the wet-process phosphoric acid solution is treated with about 0.5 to 5% (w/w) of the solid adsorbing material. In some embodiments, for the step (c) of the invention, the wet-process phosphoric acid solution is treated with about 0.5 to 2.5% (w/w) of the solid adsorbing material. In certain embodiments, for the step (c) of the invention, the wet-process phosphoric acid solution is treated with from about 0.5 to about 1% (w/w) of the solid adsorbing material. In further embodiments, the wet-process phosphoric acid solution is treated with from about 0.5 to about 0.75% (w/w) of the solid adsorbing material. As shown in FIGS. 1A and 1B, it has been found that when the solid content (i.e., the amount of solid adsorbing material) is controlled at about 0.5 to about 10% (w/w), a significantly improved Cd removal rate can be obtained. Further, the reduced amount of solids used in treating the phosphoric acid solution can result in less amount of Cd-contaminated waste cake. It has also been found that, when the solid content is controlled at the range of about 0.5 to about 5% (w/w), the Cd removal efficiency can be further improved As shown in Example 1 and Example 2, it has also been found that when the solid content is controlled at the range of about 0.5 to about 1% (w/w), the Cd adsorption efficiency of the solid adsorbing material can be significantly increased (e.g. the Cd content in calcium sulfate cake is greater than 1000 ppm). Further, in the context of plant operation, a solid content of about 0.5 to about 0.75% (w/w) can give the most desirable overall operating performance. The reduced amount of the solid adsorbing material (compared to the internally generated large amount of solid particles, i.e., about 20-40% (w/w) precipitated calcium sulfate) requires less amount of the complex reagent and produces significantly less amount of Cd-contaminated waste cake. In some embodiments, in the step (c) of the method of the invention, the wet-process phosphoric acid solution is treated with from about 0.5% to about 5% (w/w) of the solid adsorbing material and from about 150 to about 500 ppm (by weight on a 100% basis) of the complex reagent. In further embodiments, the content of the complex reagent is about 300 to about 500 ppm.

In other embodiments, in the step (c) of the method of the invention, the wet-process phosphoric acid solution is treated with from about 0.5 to about 1% (w/w) of the solid adsorbing material and from about 150 to about 500 ppm (by weight on a 100% basis) of the complex reagent. In further embodiments, the content of the complex reagent is about 200 to about 300 ppm, or about 250 ppm.

In certain embodiments, in the step (c) of the method of the invention, the wet-process phosphoric acid solution is treated with from about 0.5 to about 0.75% (w/w) of the solid adsorbing material and from about 150 to about 500 ppm (by weight on a 100% basis) of the complex reagent. In further embodiments, the content of the complex reagent is about 200 to about 300 ppm, or about 250 ppm.

In some embodiments, when the solid content is greater, the dosage rate of the complex reagent needs to be higher to obtain the desirable M content. Accordingly, in such embodiments, for the step (c) of the invention, the wet-process phosphoric acid solution is treated with from about 1 to about 5% (w/w) of the solid adsorbing material and from about 250 to about 500 ppm (by weight on a 100% basis) of the complex reagent. In further embodiments, the wet-process phosphoric acid solution is treated with from about 1 to about 5% (w/w) of the solid adsorbing material and from about 300 to about 500 ppm (by weight on a 100% basis) of the complex reagent. In other embodiments, for the step (c) of the invention, the wet-process phosphoric acid solution is treated with from about 5 to about 10% (w/w) of the solid adsorbing material and from about 250 to about 900 ppm (by weight on a 100% basis) of the complex reagent. In further embodiments, the wet-process phosphoric acid solution is treated with from about 5 to about 10% (w/w) of the solid adsorbing material and from about 300 to about 900 ppm (by weight on a 100% basis) of the complex reagent.

In some embodiments, for the step (c) of the invention, the wet-process phosphoric acid solution is treated with from about 0.5 to about 1% (w/w) of the solid adsorbing material and from about 175 to about 300 ppm (by weight on a 100% basis) of the complex reagent. In further embodiments, the wet-process phosphoric acid solution is treated with from about 0.5 to about 1% (w/w) of the solid adsorbing material and from about 200 to about 300 ppm (by weight on a 100% basis) of the complex reagent. In more specific embodiments, the wet-process phosphoric acid solution is treated with from about 0.5 to about 1% (w/w) of the solid adsorbing material and about 250 ppm (by weight on a 100% basis) of the complex reagent.

In some embodiments, for the step (c) of the invention, the wet-process phosphoric acid solution is treated with from about 0.5 to about 0.75% (w/w) of the solid adsorbing material and from about 175 to about 300 ppm (by weight on a 100% basis) of the complex reagent. In further embodiments, the wet-process phosphoric acid solution is treated with from about 0.5 to about 0.75% (w/w) of the solid adsorbing material and from about 200 to about 300 ppm (by weight on a 100% basis) of the complex reagent. In more specific embodiments, the wet-process phosphoric acid solution is treated with from about 0.5 to about 0.75% (w/w) of the solid adsorbing material and about 250 ppm (by weight on a 100% basis) of the complex reagent.

In certain embodiments, for the step (c) of the invention, the wet-process phosphoric acid solution is treated with from about 0.5 to about 2.5% (w/w) of the solid adsorbing material and from about 175 to about 500 ppm (by weight on a 100% basis) of the complex reagent. In some embodiments, for the step (c) of the invention, the wet-process phosphoric acid solution is treated with from about 0.5 to about 2.5% (w/w) of the solid adsorbing material and from about 175 to about 300 ppm (by weight on a 100% basis) of the complex reagent. In further embodiments, the wet-process phosphoric acid solution is treated with from about 0.5 to about 2.5% (w/w) of the solid adsorbing material and from about 200 to about 300 ppm (by weight on a 100% basis) of the complex reagent. In more specific embodiments, the wet-process phosphoric acid solution is treated with from about 0.5 to about 2.5% (w/w) of the solid adsorbing material and about 250 ppm (by weight on a 100% basis) of the complex reagent.

In some embodiments, for the digestion step (a) of the invention, the calcium- and heavy metal-containing phosphate ore is treated with about 80%, about 93% or about 98% sulfuric acid.

In certain embodiments, the content of calcium sulfate in the aqueous mixture resulted from the digestion step (a) of the invention is about 30 to 35% (w/w), or about 35% (w/w). In some embodiments, for the step (b) of the invention, the wet-process phosphoric acid solution contains from about 22 to about 32% (w/w) $P_2O_5$, or from about 26 to about 30% (w/w) $P_2O_5$, or about 28% (w/w) $P_2O_5$, or about 40% (w/w) $P_2O_5$. The contents of calcium sulfate and $P_2O_5$ in the phosphoric acid solution are determined and controlled by the plant operator to optimize the overall performance of the plant either for throughput, efficiency and the best combination of efficiency and throughput.

In certain embodiments, for the step (b) of the invention, the wet-process phosphoric acid solution contains more than about 40 mg M/kg $P_2O_5$, about 60 mg M/kg $P_2O_5$, about 80 mg M/kg $P_2O_5$, about 100 mg M/kg $P_2O_5$, about 200 mg M/kg $P_2O_5$, about 300 mg M/kg $P_2O_5$, about 400 mg M/kg $P_2O_5$, or about 500 mg M/kg $P_2O_5$.

In certain embodiments, for the step (b) of the invention, the wet-process phosphoric acid solution contains more than about 40 mg Cd/kg $P_2O_5$, about 60 mg Cd/kg $P_2O_5$, about 80 mg Cd/kg $P_2O_5$, about 100 mg Cd/kg $P_2O_5$, about 200 mg Cd/kg $P_2O_5$, about 300 mg Cd/kg $P_2O_5$, about 400 mg Cd/kg $P_2O_5$, or about 500 mg Cd/kg $P_2O_5$. As noted above, the Cd content varies depending on the mining sites of phosphate rocks. The invention aims to provide a method of manufacturing phosphoric acid from a calcium- and cadmium-containing phosphate ore, which can meet the desirable limit on Cd content in the intended final products.

In certain embodiments, for the step (b) of the invention, the wet-process phosphoric acid solution contains more than about 40 mg As/kg $P_2O_5$, about 60 mg As/kg $P_2O_5$, about 80 mg As/kg $P_2O_5$, about 100 mg As/kg $P_2O_5$, about 200 mg As/kg $P_2O_5$, about 300 mg As/kg $P_2O_5$, about 400 mg As/kg $P_2O_5$, or about 500 mg As/kg $P_2O_5$. In certain embodiments, for the step (b) of the invention, the wet-process phosphoric acid solution contains more than about 40 mg Cu/kg $P_2O_5$, about 60 mg Cu/kg $P_2O_5$, about 80 mg Cu/kg $P_2O_5$, about 100 mg Cu/kg $P_2O_5$, about 200 mg Cu/kg $P_2O_5$, about 300 mg Cu/kg $P_2O_5$, about 400 mg Cu/kg $P_2O_5$, or about 500 mg Cu/kg $P_2O_5$.

In some embodiments, the step (c) of the invention is conducted in a mixing tank (or reactor). For example, the predetermined amounts of the complex reagent and the solid adsorbing material are added into the tank, and then the resulting solution is pumped through a filter press (e.g., a plate and frame filter) to achieve the solid/liquid separation (i.e., the step (d)). Plate and frame filters have multiple plates that contain cavities to be filled with solids during a filtration cycle. The plates are held together by a hydraulic ram that seals the unit. When solids have filled the cavities, the ram is released and the plates are separated. Usually the solids will fall off in sheets into a catch pan or on a conveyor. The plate and frame filter is well-known to one of ordinary skill in the art, and the exact type or design of the filter useful in practice of the invention is not limited.

In some embodiments, for the step (c) of the invention, the cadmium complex-contaminated solid adsorbing material has more than about 1000 ppm Cd adsorbed thereon, or more than 1500, 2000, 2500, 3000, 3500, 5000, or 7500 ppm, or higher depending upon the initial amount cadmium in the pre-treated acid. As shown in Table 2, it has been found that when the solid content is further reduced to 0.6% (w/w) from 1% (w/w), the Cd adsorption efficiency of the solid adsorbing material can be tripled (e.g., Cd content in the filter cake increased from 1320 ppm to 3910 ppm).

In some embodiments, for the step (d) of the invention, the resulting contaminated solid adsorbing material may be removed by one or more conventional filtration steps, e.g., by a plate and frame filter, flotation separation, active carbon separation, vacuum filtration, pressure filtration, gravity filtration, compression filtration, magnetic filtration and/or other liquid/solid separation techniques known in the art. In some embodiments, the step (d) of the invention is conducted using a solid separation technique selected from the group consisting of flotation separation, active carbon separation, vacuum filtration, pressure filtration, gravity filtration, compression filtration, and magnetic filtration.

In some more specific embodiments, the solid content is controlled at no greater than 0.75% (w/w), e.g. from about 0.5% to about 0.75% (w/w), to achieve the most desirable overall operating performance of the plate and frame filter. In one aspect, the invention also provides a method for removing other heavy metals present in the phosphate ore from the phosphoric acid solution. In some embodiments of the method of the invention, the calcium- and heavy metal-containing phosphate ore further comprises one or more other heavy metals, and the method further comprises forming a complex-contaminated solid adsorbing material containing the one or more heavy metals in the step (c), and removing the complex-contaminated solid adsorbing material from the phosphoric acid solution to yield the treated phosphoric acid solution in the step (d). In further embodiments, the one or more heavy metals are copper, lead, nickel, arsenic, manganese, mercury, or any combination thereof. In further specific embodiments, the additional heavy metal is arsenic. In further specific embodiments, the additional heavy metal is copper. The additional heavy metals are removed from the phosphoric acid solution in the manner similar to how the original heavy metal impurity is removed. In such instances, the wet-process phosphoric acid solution (containing the additional heavy metals) is treated with the solid adsorbing material and the complex reagent to form a complex-contaminated solid adsorbing material containing the additional heavy metals. The contaminated solid adsorbing material is then removed from the phosphoric acid solution to yield a treated phosphoric acid solution having a lower content of the additional heavy metals as compared with the pre-treated phosphoric acid solution.

In more specific embodiments, the invention provides a method for removing arsenic from the phosphoric acid solution. In some embodiments, for the step (c) of the method of the invention, the wet-process phosphoric acid solution (optionally containing arsenic and/or copper) is treated with from about 300 to about 500 ppm (by weight on a 100% basis) of the complex reagent, further wherein the complex reagent is an ammonium, sodium, or potassium salt of di-isobutyl dithiophosphinate.

In some embodiments, for the step (c) of the method of the invention, the wet-process phosphoric acid solution is treated with from about 300 to about 500 ppm (by weight on a 100% basis) of the complex reagent, further wherein the complex reagent is an ammonium, sodium, or potassium salt of di-isobutyl dithiophosphate.

In some embodiments, for the step (c) of the method of the invention, the wet-process phosphoric acid solution is treated with from about 100 to about 1500 ppm (by weight on a 100% basis) of the complex reagent, further wherein the complex reagent is an ammonium, sodium, or potassium salt of isobutyl xanthate.

In some embodiments, for the step (c) of the method of the invention, the wet-process phosphoric acid solution is treated with from about 100 to about 900 ppm (by weight on a 100% basis) of the complex reagent, further wherein the complex reagent is an ammonium, sodium, or potassium salt of isobutyl xanthate.

In some embodiments, for the step (c) of the method of the invention, the wet-process phosphoric acid solution is treated with from about 300 to about 600 ppm (by weight on a 100% basis) of the complex reagent, further wherein the complex reagent is an ammonium, sodium, or potassium salt of isobutyl xanthate.

In certain embodiments, the As removal rate is more than about 10%, about 20%, about 50%, or about 95%. As used herein, copper, lead, nickel, arsenic, manganese, or mercury is referred as in an elemental or metallic state in the form in which it appears in, for example, ore, wet-process phosphoric acid solution, recycled solution, and waste cake. Where not explicitly stated, those skilled in the art are expected to appreciate the context. And unless otherwise specified, each of the heavy metals may be in its naturally occurring valence state.

"Complex-contaminated solid adsorbing material" refers to the solid material resulted from treating the wet-process phosphoric acid solution with the solid adsorbing material and the complex reagent. To illustrate, when the phosphate ore contains cadmium and arsenic, the phosphoric acid solution resulted from the step (c) of the method of the invention contains the cadmium complex-contaminated solid adsorbing material and the complex-contaminated solid adsorbing material containing arsenic. The step (d) of the method of the invention then removes both the cadmium complex-contaminated solid adsorbing material and the complex-contaminated solid adsorbing material containing arsenic from the phosphoric acid solution to yield the treated phosphoric acid solution having lower Cd and As contents. In the context of the invention, a contaminated solid adsorbing material can be understood as a solid adsorbing material having a complex of cadmium and the complex reagent, and/or a complex of any of the additional heavy metal impurities (e.g., arsenic) and the complex reagent, adhered thereon.

In more specific embodiments, the invention provides a method for manufacturing phosphoric acid from a calcium- and heavy metal-containing phosphate ore, comprising the steps of: (a) digesting the calcium- and heavy metal-containing phosphate ore with sulfuric acid to give an aqueous mixture of calcium sulfate, phosphoric acid, and heavy metal impurities, wherein the content of calcium sulfate in the aqueous mixture is from about 30 to about 35% (w/w); (b) removing the calcium sulfate from the aqueous mixture to give a wet-process phosphoric acid solution containing from about 26 to about 30% (w/w) $P_2O_5$ and having a pre-treated heavy metal content more than about 40 mg M/kg $P_2O_5$; (c) treating the wet-process phosphoric acid solution with from about 0.5 to about 1% (w/w) of a solid adsorbing material and from about 200 to about 300 ppm (by weight on a 100% basis) of a complex reagent to form a heavy metal complex-contaminated solid adsorbing material, wherein the phosphoric acid solution is maintained during treatment at a temperature between 20-60° C., wherein the temperature is sufficient to allow treatment time to be up to about 90 minutes without significant decomposition of the heavy metal complex, and wherein the amount of complex reagent added is sufficient to lower the heavy metal content by at least about 10% at the temperature maintained; and (d) removing the heavy metal complex-contaminated solid adsorbing material from the phosphoric acid solution to yield a treated phosphoric acid solution having a post-treated heavy metal content at least about 80% lower than the pre-treated heavy metal content.

In further embodiments, the solid adsorbing material is calcium sulfate, and the complex reagent is an ammonium, sodium, or potassium salt of di-isobutyl dithiophosphate, di-isobutyl dithiophosphinate, 2-methylpropanedithioate, or isobutyl xanthate. In specific embodiments, the solid adsorbing material is calcium sulfate, and the complex reagent is an ammonium, sodium, or potassium salt of isobutyl xanthate.

The solid content and the dosage rate of the complex reagent employed in the method of the invention may be adjusted in view of the pre-treated M content. In some embodiments, the invention provides a method for manufacturing phosphoric acid from a calcium- and heavy metal-containing phosphate ore, comprising the steps of: (a) digesting the calcium- and heavy metal-containing phosphate ore with sulfuric acid to give an aqueous mixture of calcium sulfate, phosphoric acid, and heavy metal impurities, wherein the content of calcium sulfate in the aqueous mixture is from about 20 to about 40% (w/w); (b) removing the calcium sulfate from the aqueous mixture to give a wet-process phosphoric acid solution containing from about 20 to about 45% (w/w) $P_2O_5$ and having a pre-treated heavy metal content more than about 10 mg M/kg $P_2O_5$; (c) treating the wet-process phosphoric acid solution with from about 0.5 to about 25% (w/w) of a solid adsorbing material and from about 100 to about 1000 ppm (by weight on a 100% basis) of a complex reagent to form a heavy metal complex-contaminated solid adsorbing material, wherein the phosphoric acid solution is maintained during treatment at a temperature between 20-60° C., wherein the temperature is sufficient to allow treatment time to be up to about 90 minutes without significant decomposition of the heavy metal complex, and wherein the amount of complex reagent added is sufficient to lower the heavy metal content by at least about 10% at the temperature maintained; and (d) removing the heavy metal complex-contaminated solid adsorbing material from the phosphoric acid solution to yield a treated phosphoric acid solution having a post-treated heavy metal content at least about 10% lower than the pre-treated heavy metal content.

EXAMPLES

In order that this invention may be more fully understood, the following examples are set forth. These examples are for the purpose of illustrating embodiments of this invention, and are not to be construed as limiting the scope of the invention in any way. The reactants used in the examples below may be obtained either as described herein, or if not described herein, are themselves either commercially available or may be prepared from commercially available materials by methods known in the art.

Example 1

Filtration Study with Various Amounts of Calcium Sulfate

This study aims to evaluate the effect of the solid content (i.e., the amounts of calcium sulfate) in removing Cd from a wet-process phosphoric acid solution. The design with the application of a filter intends to simulate the filling of a plate and frame filter.

Multiple batches of wet-process phosphoric acid solutions ("Acid") and various amounts of calcium sulfate ("Solid") and Reagent #4 ("Reagent") were mixed according to the amounts listed in the following Table 1A in a reactor and then filtered on a filter to allow the calcium sulfate to accumulate to a certain depth or thickness. "Reagent #4" represented ammonium di-isobutyl dithiophosphate. In this study, the amount of calcium sulfate on the filter was set to about 20-22 g. As shown in Table 1A, two groups of the study were conducted, one group was treated with 175 ppm of Reagent #4 (the complex reagent), the other with 250 ppm of Reagent #4.

TABLE 1A

Conditions for the filtration study

| Solid % (w/w) | Acid (g) | Solid (g) | Reagent (g) | Solid on filter (g) |
|---|---|---|---|---|
| Reagent #4: 175 ppm (listed amount of 5% base solution) | | | | |
| 35.00 | 40 | 21.54 | 0.14 | 21.54 |
| 25.00 | 65 | 21.67 | 0.23 | 21.67 |
| 15.00 | 122 | 21.54 | 0.43 | 21.54 |
| 5.00 | 100 | 5.26 | 0.35 | 21.05 |
| 2.50 | 200 | 5.26 | 0.70 | 21.05 |
| 1.00 | 200 | 2.02 | 0.70 | 20.20 |
| 0.75 | 200 | 1.51 | 0.70 | 21.16 |
| Reagent #4: 250 ppm (listed amount of 5% base solution) | | | | |
| 35.00 | 40 | 21.54 | 0.20 | 21.54 |
| 25.00 | 65 | 21.67 | 0.33 | 21.67 |
| 15.00 | 122 | 21.54 | 0.61 | 21.54 |
| 5.00 | 100 | 5.26 | 0.50 | 21.05 |
| 2.50 | 200 | 5.26 | 1.00 | 21.05 |
| 1.00 | 200 | 2.02 | 1.00 | 20.20 |
| 0.75 | 200 | 1.51 | 1.00 | 21.16 |

The first test (with 35% (w/w) Solid) in the 175 ppm group was conducted according to the following procedure. About 40 g of wet-process phosphoric acid solution (containing about 28-30% (w/w) $P_2O_5$) and about 21.54 g of dry calcium sulfate were introduced into a reactor. Into the same reactor, about 175 ppm (by weight on a 100% basis) of Reagent #4 was also added (i.e., about 0.14 g of 5% base solution of Reagent #4). After treatment at ambient room temperature for about 1 to 3 minutes, the mixture was filtered till the amount of calcium sulfate on the filter reached to the predetermined depth or thickness (and the quantity was measured to be about 21.54 g).

Other tests were conducted in the same manner with various amounts of Acid, Solid and Reagent as listed in Table 1A. The tests were conducted by using 5% base solution of the reagents. For example, to make a 5% solution of Reagent #4, 5 grams of the reagent powder are added to 95 grams of water. The dosage rates were calculated in ppm using the following formula.

[(grams of reagent)×(base solution concentration)/
(grams of acid treated)]×1,000,000

Example: (0.3 g×0.05)/100 g×1,000,000=150 ppm
(i.e., 150 ppm=adding 0.3 g of 5% base solution of the reagent into a 100 G acid solution)

Cd Removal with Various Amounts of Calcium Sulfate

Resulting filtered acid solutions were analyzed for $P_2O_5$ and Cd contents. Results were reported with Cd concentration in ppm, $P_2O_5$ reported in % (w/w), and the Cd to $P_2O_5$ ratio reported as mg Cd/kg $P_2O_5$.

mg Cd/kg $P_2O_5$=ppm Cd/% $P_2O_5$×100

The results of analyzing the resulting filtered acid solutions are summarized in the following Table 1B and shown in FIGS. 1A and 1B. It has been observed that when the solid content (the amounts of added calcium sulfate) was reduced, the Cd removal efficiency was significantly improved. For example, when the solid content is controlled at the range of about 0.5 to about 10%, the Cd removal efficiency is significantly improved. When reducing the solid content to lower than about 5%, the Cd removal efficiency is further improved. To see this, compare the results between the tests with 15% (w/w) solids and with 5% (w/w) solids. The fewer amounts the calcium sulfate are used, the less Cd-contaminated waste cakes are produced. Accordingly, it is beneficial to employ a lower solid content without compromising the desirable Cd removal efficiency.

TABLE 1B

Cd removal with various amounts of Solid

| Solid % (w/w) | $P_2O_5$ % (w/w) | Cd (ppm) | mg Cd/kg $P_2O_5$ |
|---|---|---|---|
| Reagent #4: 175 ppm | | | |
| 35.00 | 28.92 | 6.53 | 22.58 |
| 25.00 | 29.2 | 3.98 | 13.63 |
| 15.00 | 28.87 | 2.98 | 10.32 |
| 5.00 | 28.93 | 1.27 | 4.39 |
| 2.50 | 28.71 | 1.33 | 4.63 |
| 1.00 | 28.48 | 0.92 | 3.23 |
| 0.75 | 28.53 | 1.93 | 6.77 |
| Reagent #4: 250 ppm | | | |
| 35.00 | 29.22 | 2.82 | 9.65 |
| 25.00 | 28.59 | 1.46 | 5.11 |
| 15.00 | 28.69 | 1.43 | 4.98 |
| 5.00 | 28.45 | 0.53 | 1.86 |
| 2.50 | 28.99 | 0.63 | 2.17 |
| 1.00 | 28.98 | 1.17 | 4.04 |
| 0.75 | 29.15 | 1.55 | 5.32 |

Cd Content in Calcium Sulfate Cakes and Wash Waters

For the group treated with 175 ppm of Reagent #4, the calcium sulfate cakes (the filtered solids) were washed with DI water, dried at 105° C., and collected. The calcium sulfate cakes and the wash waters were analyzed for Cd content. The analysis results are summarized in the following Table 1C. It has been observed that when the solid content was less than about 5% (w/w), the Cd adsorption efficiency of calcium sulfate was significantly improved (e.g., from 87 to 356 ppm for reducing the solid content from 15 to 5% (w/w)). When the solid content was further reduced to 0.75% (w/w), the Cd adsorption efficiency of calcium sulfate was also further improved (e.g. to 2470 ppm).

TABLE 1C

Cd content in the filtered cake and wash water

| Solid % (w/w) | Cd in wash water (ppm) | Cd in calcium sulfate cake (ppm) |
| --- | --- | --- |
| 35.00 | 4.54 | 13 |
| 25.00 | 5.33 | 30 |
| 15.00 | 5.35 | 87 |
| 5.00 | 2.59 | 356 |
| 2.50 | 0.98 | 726 |
| 1.00 | 0.33 | 1940 |
| 0.75 | 0.98 | 2470 |

Example 2

Filtration Study with a Solid Content Lower than about 1% (W/W)

A filtration study similar to Example 1 was conducted with a solid content lower than about 1% (w/w). Wet-process phosphoric acid solutions (about 26-28% (w/w) $P_2O_5$), 250 ppm of Reagent #1, and various amounts of calcium sulfate ("Solid", at about 0.6-1% (w/w)) were mixed, filtered, and then analyzed according to the procedures noted in Example 1. In this study, the As content in the resulting samples was also analyzed. "Reagent #1" represents the sodium di-isobutyl dithiophosphinate. The analysis results are summarized in the following Table 2. "Acid at start" means the wet-process phosphoric acid solution prior to the treatment. "Treated Acid" means the resulting filtered acid solution. "Filter cake" means the filtered calcium sulfate cake. Consistent with the results of Example 1, it has been further observed that when the solid content was controlled at about 0.6% (w/w), the Cd adsorption efficiency of calcium sulfate was tripled as compared with that of the sample having 1% (w/w) Solid (increased from 1320 to 3910 ppm). Similar to the Cd removal results, the As removal rate and As adsorption efficiency of calcium sulfate were improved when the solid content was reduced to about 0.6% (w/w) from about 1% (w/w). Lower solid content improves the Cd removal efficiency of the complex reagent and helps to concentrate the heavy metal impurities on the solid adsorbing materials for disposal.

TABLE 2

Cd removal with a solid content lower than about 1% (w/w)

| Tested sample | $P_2O_5$ % (w/w) | Cd (ppm) | mg Cd/kg $P_2O_5$ | As (ppm) |
| --- | --- | --- | --- | --- |
| 1% (w/w) Solid | | | | |
| Acid at start | 26.78 | 22.3 | 83.3 | 9.3 |
| Treated Acid | 26.97 | 2.27 | 8.4 | 9.2 |
| Filtered cake | | 1320 | | 10.5 |
| 0.75% (w/w) Solid | | | | |
| Acid at start | 27.9 | 20.9 | 74.9 | 8.8 |
| Treated Acid | 27.79 | 1.6 | 5.8 | 0.7 |
| Filtered cake | | 2040 | | 927 |

TABLE 2-continued

Cd removal with a solid content lower than about 1% (w/w)

| Tested sample | $P_2O_5$ % (w/w) | Cd (ppm) | mg Cd/kg $P_2O_5$ | As (ppm) |
| --- | --- | --- | --- | --- |
| 0.6% (w/w) Solid | | | | |
| Acid at start | 27.9 | 20.9 | 74.9 | 8.8 |
| Treated Acid | 28.37 | 2.8 | 9.9 | 0.3 |
| Filtered cake | | 3910 | | 1060 |

Simulation of a Plate and Frame Filter

Figure 2:
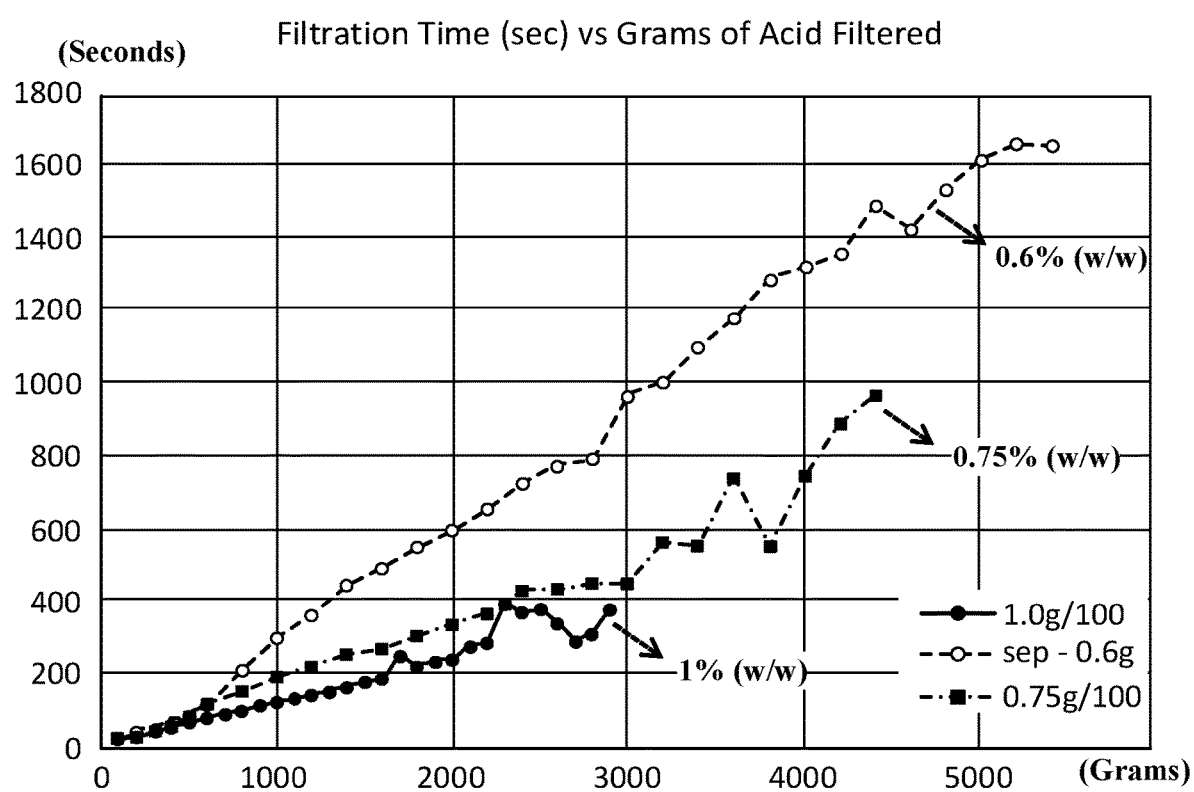
FIG. 2 shows plots of the weight of the phosphoric acid solution filtered (grams) versus the filtration time (seconds) in an exemplary experiment of the present invention.

In this test, the resulting mixture was filtered on a lab-scale filter, allowing the calcium sulfate to accumulate to a thickness of about 32 mm. The results of the filter simulation are shown in FIG. 2 (the unit for the Y axis means "seconds per batch of acid" and for the X axis "total amount of acid filtered in grams"). Several these tests with various solids loadings were performed to evaluate the desirable cycle time and filtration rates applicable in a plate and frame filter setting. Based on the test results, it has been found that about 0.5% to 0.75% solids loading gave the most desirable overall operating performance of the filter.

Example 3

Profile Study of Various Complex Reagents

Profile studies were performed with various dosage rates of complex reagents, using about 5% (w/w) solid adsorbing material (calcium sulfate) as the collector. In another study, it has been found that, to obtain the desirable results, as the amount of solid adsorbing material present increased, the dosage rate of the complex reagent also increased.

About 100 g of wet-process phosphoric acid solution (containing about 28-30% (w/w) $P_2O_5$) and about 5 g of dry calcium sulfate were introduced into a reactor. Into the same reactor, about 50-900 ppm (by weight on a 100% basis) of one of the listed complex reagents was also added. After agitation at ambient room temperature for about 1 to 3 minutes, the mixture in each test was filtered and analyzed for cadmium (Cd) and arsenic (As) contents.

Figure 3A:
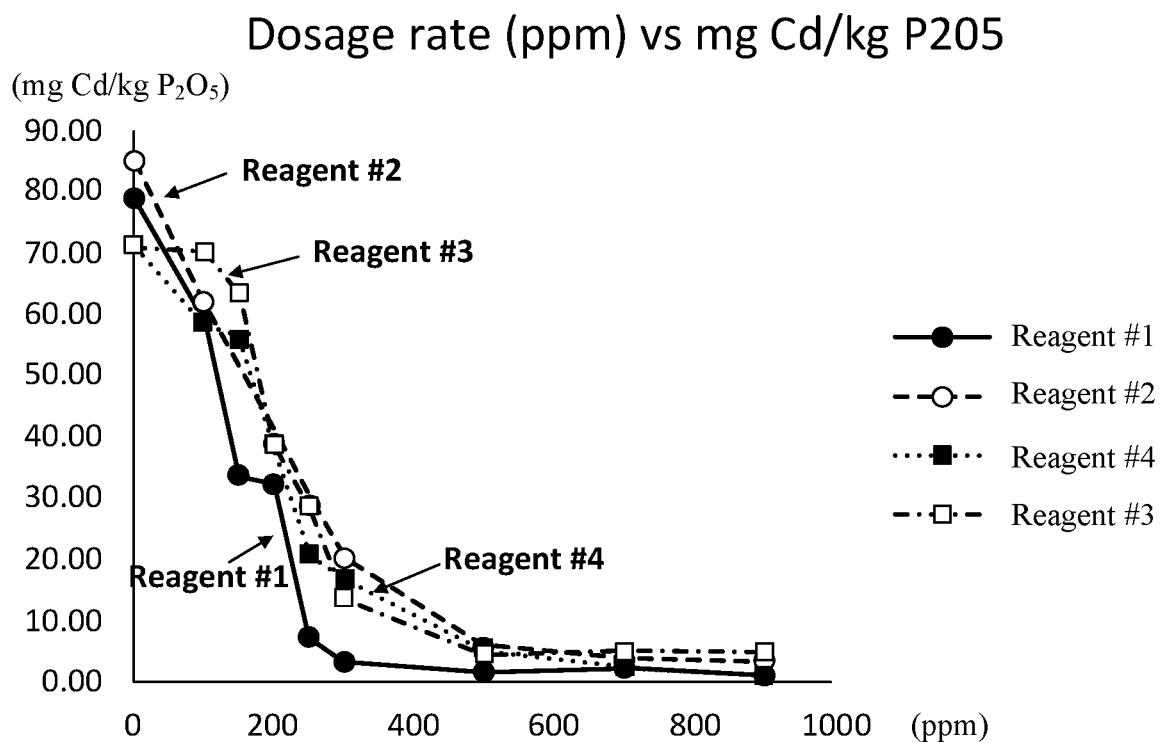
FIGS. 3A and 3B show, respectively, plots of the weight of heavy metal impurities removed (mg Cd/kg $P_2O_5$ for FIG. 3A; mg As/kg $P_2O_5$ for FIG. 3B) versus various amounts of different complex reagents added (ppm) in an exemplary experiment of the present invention.
Figure 3B:
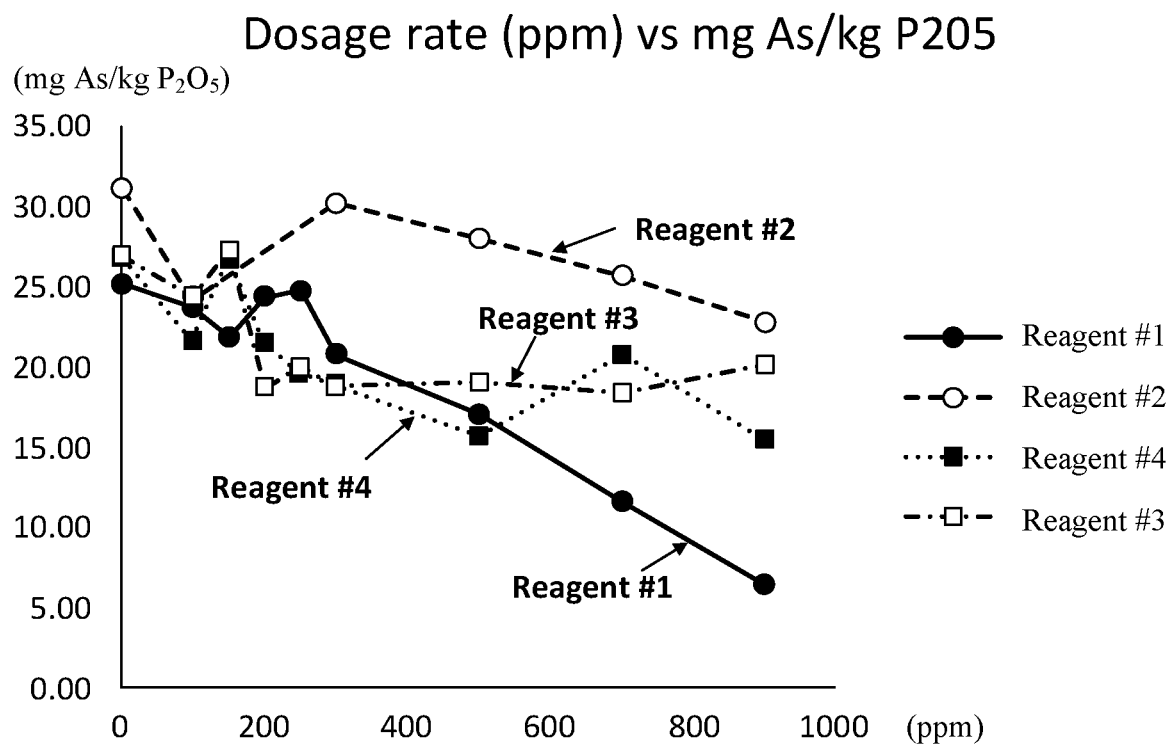

The results of this study are summarized in Table 3 below and shown in FIGS. 3A and 3B. The one labeled "Reagent #1" was the sodium di-isobutyl dithiophosphinate. The ones labeled "Reagent #2" and "Reagent #3" were sodium di-isobutyl dithiophosphates from different vendors. The "Reagent #4" was ammonium di-isobutyl dithiophosphate. All the tests were conducted using 5% base solution for the reagents. The results indicate that when a small amount (e.g. about 5% (w/w)) of solid adsorbing material (calcium sulfate) was used, the complex reagents can remove at least about 10% of the heavy metal impurities with the dosage rate as less as 150 ppm. When the dosage rate increases, the Cd removal rate also increases. For example, the Cd removal rate can reach at least 40% when 200 ppm of the complex reagent was used to treat the wet-process phosphoric acid solution. Further, all tested complex reagents exhibit good Cd removal efficiency when the dosage rate was about 250 ppm. At such dosage rate, sodium di-isobutyl dithiophosphinate can reduce the Cd content to below 10 mg Cd/kg $P_2O_5$, while ammonium di-isobutyl dithiophosphate can reduce the Cd content to about 20 mg Cd/kg $P_2O_5$. As shown in FIG. 3B, it has also been observed that when the dosage rate of the complex reagent is controlled at about or greater than 300 ppm, the As removal efficiency can be significantly improved.

TABLE 3

Cd removal with various complex reagents and various amounts thereof

| Dosage (ppm) | $P_2O_5$ % (w/w) | Cd (ppm) | mg Cd/kg $P_2O_5$ | Cd removal rate % |
|---|---|---|---|---|
| Reagent #1 | | | | |
| 0 | | | 83.3 | |
| 50 | 26.81 | 13.7 | 51.10 | 39% |
| 100 | 27.42 | 13.1 | 47.78 | 43% |
| 200 | 26.99 | 11.2 | 41.50 | 50% |
| 300 | 26.89 | 2.1 | 7.81 | 91% |
| 500 | 27.02 | 0.76 | 2.81 | 97% |
| 700 | 26.89 | 1.4 | 5.21 | 94% |
| 900 | 27.24 | 1.4 | 5.14 | 94% |
| Reagent #2 | | | | |
| 0 | 28.38 | 24.1 | 84.92 | |
| 100 | 28.83 | 17.94 | 62.23 | 27% |
| 300 | 28.62 | 5.8 | 20.27 | 76% |
| 500 | 27.97 | 1.54 | 5.51 | 94% |
| 700 | 28.12 | 1.05 | 3.73 | 96% |
| 900 | 27.81 | 0.83 | 2.98 | 96% |
| Reagent #4 | | | | |
| 0 | 29.48 | 21 | 71.23 | |
| 100 | 29.29 | 17.2 | 58.72 | 18% |
| 150 | 29.52 | 16.5 | 55.89 | 22% |
| 200 | 29.87 | 11.7 | 39.17 | 45% |
| 250 | 29.19 | 6.1 | 20.90 | 71% |
| 300 | 29.15 | 4.9 | 16.81 | 76% |
| 500 | 28.76 | 1.5 | 5.22 | 93% |
| 700 | 29.1 | 0.6 | 2.06 | 97% |
| 900 | 28.55 | 0.3 | 1.05 | 99% |
| Reagent #3 | | | | |
| 0 | 29.48 | 21 | 71.23 | |
| 100 | 29.18 | 20.5 | 70.25 | 1% |
| 150 | 29.49 | 18.7 | 63.41 | 11% |
| 200 | 29.4 | 11.4 | 38.78 | 46% |
| 250 | 29.13 | 8.4 | 28.84 | 60% |
| 300 | 29.39 | 4 | 13.61 | 81% |
| 500 | 29.01 | 1.2 | 4.14 | 94% |
| 700 | 28.95 | 1.4 | 4.84 | 93% |
| 900 | 29.4 | 1.4 | 4.76 | 93% |

Example 4

Profile Study with Reagent #4

A profile test similar to Example 3 (using about 5% (w/w) calcium sulfate) was conducted by employing Reagent #4 as the complex reagent. The test results are summarized in the following Table 4. When 200 ppm the complex reagent was used to treat the acid solution, the Cd removal rate was about 70% (calculated by (60.5−18.7)/60.5) and the Cd content was reduced to under 20 mg Cd/kg $P_2O_5$. The Cd removal rate was further increased when more complex reagent was employed (about 80% for 250 ppm; about 90% for 300 ppm; about 96% for 500 ppm).

TABLE 4

Cd removal with Reagent #4

| Dosage (ppm) | $P_2O_5$ % (w/w) | Cd (ppm) | mg Cd/kg $P_2O_5$ | Cd removal rate % |
|---|---|---|---|---|
| 0 | 29.11 | 17.6 | 60.5 | |
| 150 | 27.54 | 9.12 | 33.1 | 45% |
| 200 | 28.97 | 5.41 | 18.7 | 69% |
| 250 | 29.15 | 3.36 | 11.5 | 81% |
| 300 | 28.75 | 1.83 | 6.4 | 89% |
| 500 | 28.38 | 0.66 | 2.3 | 96% |
| 700 | 29.79 | 0.43 | 1.5 | 98% |

Example 5

Profile Study with Reagent #1

Figure 4:
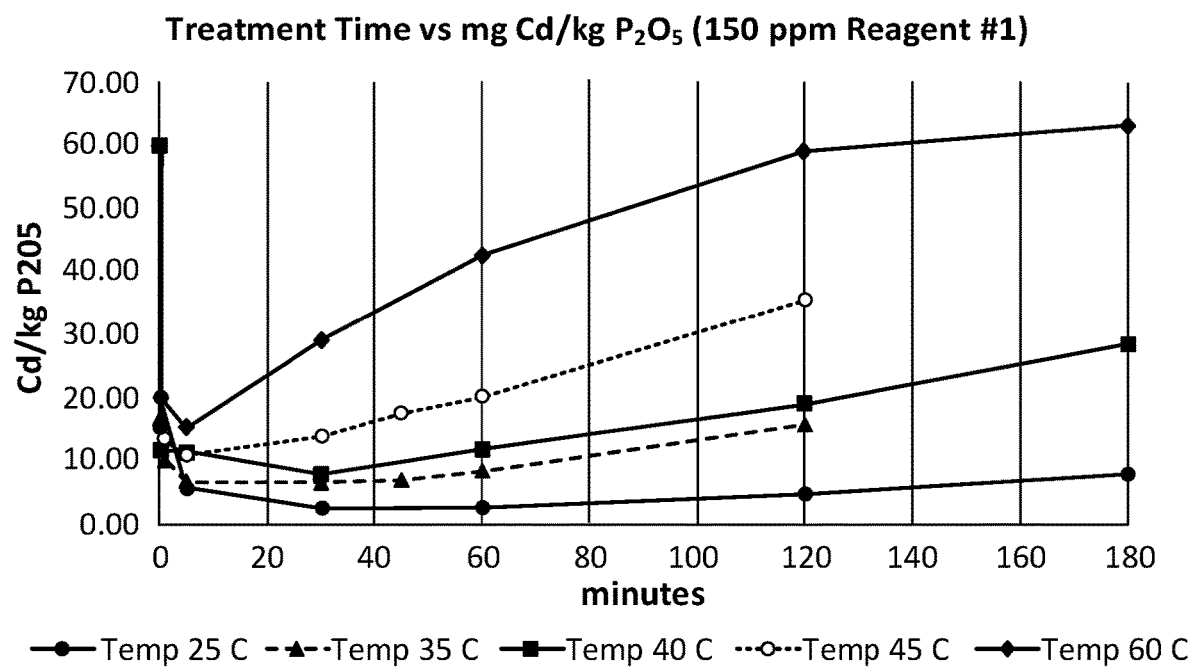
FIG. 4 shows a plot of the weight of Cadmium (Cd) removed (mg Cd/kg $P_2O_5$) versus treatment time (minutes) when Reagent #1 (150 ppm) was employed at various temperatures (° C.) for an exemplary experiment of the present invention.

A profile test was conducted by employing Reagent #1 (150 ppm) as the complex reagent and varying acid temperature (25-60° C.) and treatment time (0-180 minutes). The test results are summarized in FIG. 4 and Table 5. When 150 ppm of Reagent #1 was used to treat the acid solution with an initial concentration of about 60 mg Cd/kg $P_2O_5$, decreasing performance of the complex reagent was observed with increasing temperature and time.

TABLE 5

Treatment Time versus Cadmium Concentration at Various Acid Temperatures (Reagent #1 at 150 ppm)

| Time (min) | $P_2O_5$ % (w/w) | Cd (ppm) | mg Cd/kg $P_2O_5$ |
|---|---|---|---|
| 25° C. | | | |
| 0.17 | 28.83 | 5.75 | 19.94 |
| 5 | 28.84 | 1.61 | 5.58 |
| 30 | 28.91 | 0.74 | 2.56 |
| 60 | 28.78 | 0.73 | 2.54 |
| 120 | 29 | 1.38 | 4.76 |
| 180 | 28.79 | 2.28 | 7.92 |
| 35° C. | | | |
| 1 | 29.12 | 4.8 | 16.48 |
| 5 | 29.46 | 3.01 | 10.22 |
| 15 | 29.27 | 1.92 | 6.56 |
| 30 | 29.15 | 1.93 | 6.62 |
| 45 | 29.04 | 2.02 | 6.96 |
| 60 | 29.31 | 2.48 | 8.46 |
| 120 | 29.49 | 4.67 | 15.84 |
| 40° C. | | | |
| 0.17 | 29.35 | 3.45 | 11.75 |
| 5 | 28.62 | 3.24 | 11.32 |
| 30 | 28.52 | 2.25 | 7.89 |
| 60 | 27.97 | 3.33 | 11.91 |
| 120 | 28.78 | 5.49 | 19.08 |
| 180 | 28.34 | 8.1 | 28.58 |
| 45° C. | | | |
| 1 | 28.75 | 4.34 | 15.10 |
| 5 | 28.99 | 3.84 | 13.25 |
| 15 | 28.92 | 3.14 | 10.86 |
| 30 | 28.63 | 3.96 | 13.83 |
| 45 | 28.73 | 5.05 | 17.58 |
| 60 | 29.49 | 5.95 | 20.18 |
| 120 | 28.75 | 10.2 | 35.48 |
| 60° C. | | | |
| 0.17 | 28.53 | 5.69 | 19.94 |
| 5 | 28.24 | 4.34 | 15.37 |
| 30 | 28.23 | 8.53 | 29.18 |
| 60 | 28.83 | 12.3 | 42.66 |
| 120 | 28.57 | 16.9 | 59.15 |
| 180 | 29 | 18.3 | 63.10 |

Example 6

Filtration Study with Reagent Concentration Versus Acid Temperature

Figure 5:
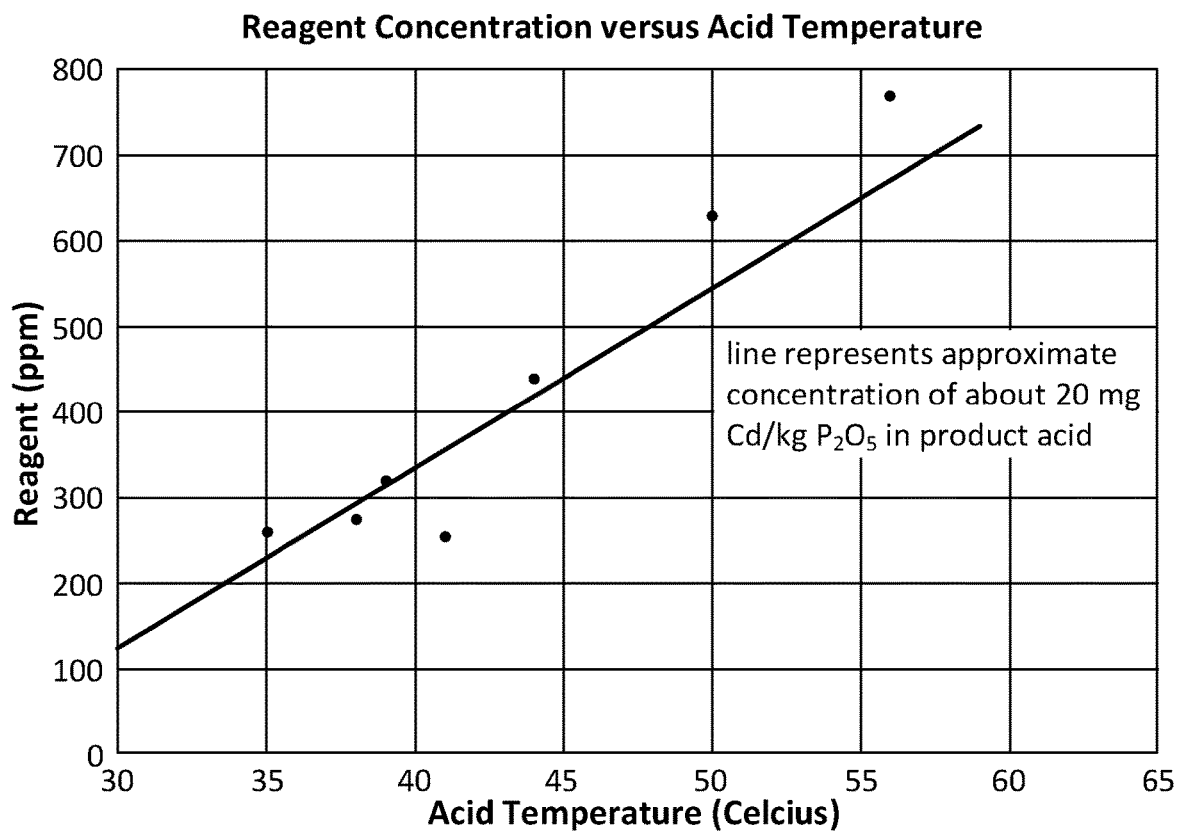
FIG. 5 shows a plot of reagent concentration (Reagent #1, ppm) versus acid temperature (° C.), wherein the trendline represents the approximate concentration of 20 mg Cd/kg $P_2O_5$ in the product acid for an exemplary experiment of the present invention. Values displayed are approximate and may be about +/−25%.
Figure 6A:
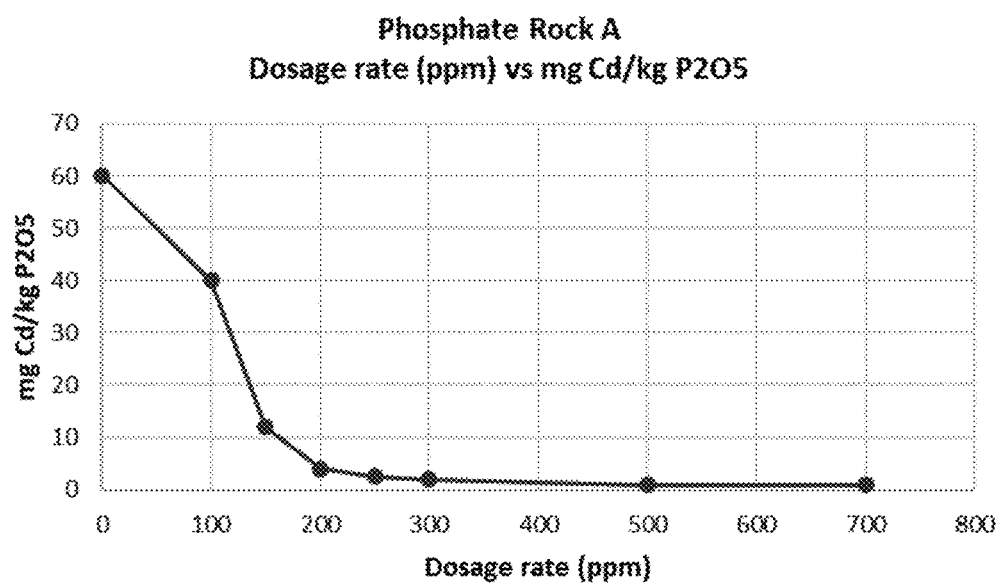
FIGS. 6A-6D show plots of Cadmium (Cd) removed (mg Cd/kg $P_2O_5$) from Phosphoric Acids A-D, respectively, versus Reagent #4 concentration (ppm) for exemplary experiments of the present invention.
Figure 6B:
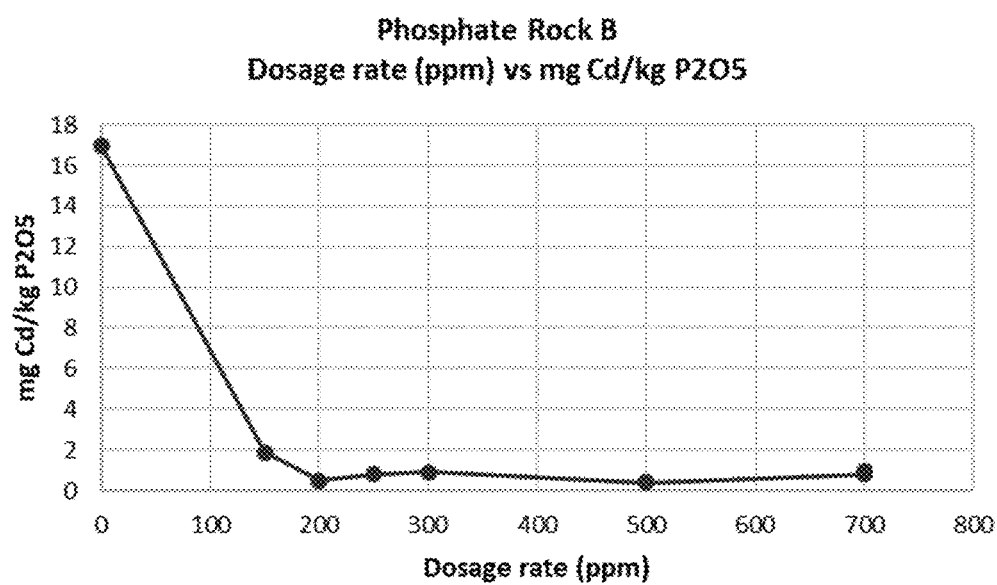
Figure 6C:
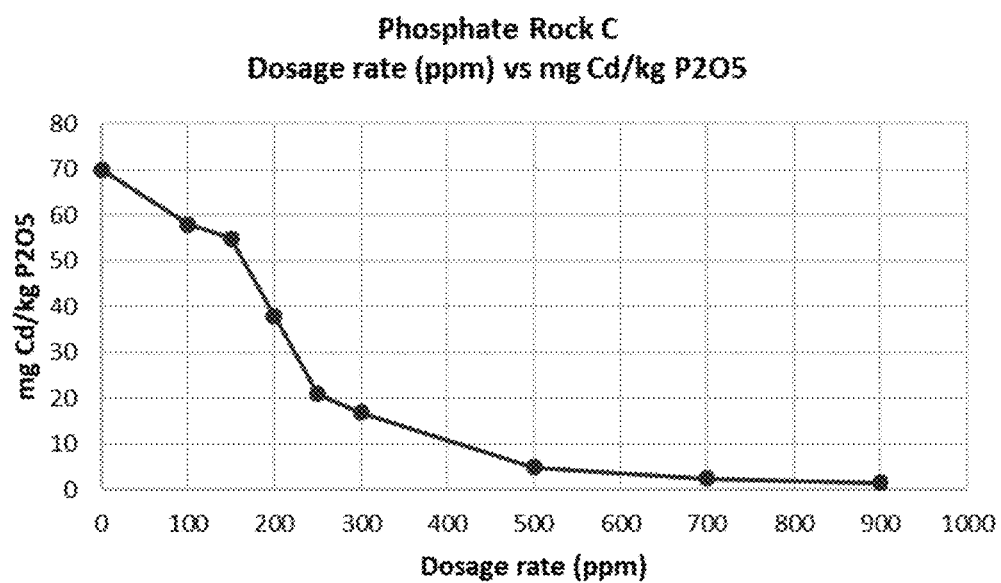
Figure 6D:
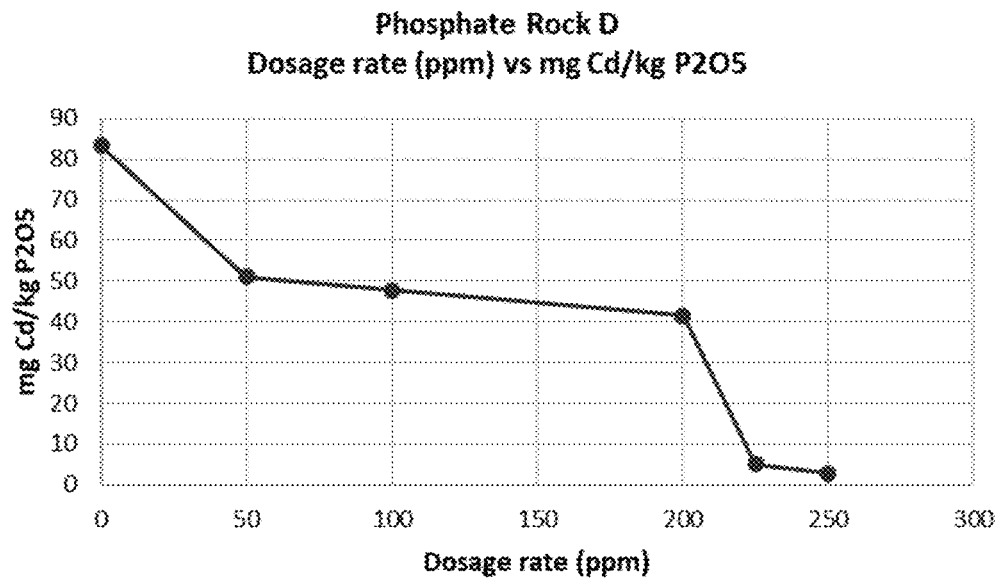

This study aims to evaluate the effect of the reagent concentration (i.e., the amounts of the sodium salt of di-isobutyl dithiophosphinate) and acid temperature (i.e., ° C.) in removing Cd from a wet-process phosphoric acid solution. Tests were performed at various reagent concentrations (Reagent #1, about 100-800 ppm) and acid temperatures (about 30-60° C.) by employing direct injection of diluted reagent solutions into 28% phosphoric acid containing low solids concentrations (e.g., 0.5% to 1.5%). Solids were removed along with the reagent and portions of the cadmium content using a plate and frame filter. Test results were used to generate a reagent concentration versus acid temperature dosage rate curve to obtain 20 mg Cd per kg of $P_2O_5$ in the product acid (see, FIG. 5 and Table 6). Dosage rates were calculated as ppm concentrations in the feed acid to the filter based on a 100% reagent bases. Reagent #1, sodium di-isobutyl dithiophosphinate, contained 50% of the active ingredient.

TABLE 6

Reagent Concentration versus Acid Temperature

| Reagent #1 (ppm)* | Acid Temp (° C.) | Cd in Treated Acid (ppm) |
|---|---|---|
| 260 | 35 | 5 |
| 275 | 38 | 8 |
| 320 | 39 | 10 |
| 255 | 41 | 7 |
| 440 | 44 | 5 |
| 630 | 50 | 3 |
| 770 | 56 | 1 |

*values displayed are approximate and may be +/−25%

The above data in Example 5 and Example 6 demonstrate that reagent performance is improved and that reagent consumption is reduced at lower acid temperatures. Additionally, these data demonstrate that there is an optimal dosage rate for addition of the reagent that varies with acid temperature. Further, the disclosed cadmium removal process offers the flexibility to reduce the cadmium content in the treated acid to the level desired (up to less then 1 mg Cd/kg $P_2O_5$). Further, all the removed cadmium from the acid is concentrated in a small quantity of the phosphogypsum (filter cake) that can be easily handled compared to other existing techniques in the art.

Example 7

Profile Study of Various Phosphoric Acid Solutions

A profile test was conducted for each phosphate rock (A, B, C and D) using 5% (w/w) of solid adsorbing material (calcium sulfate), maintaining acid temperature at 25° C. and treatment time at about 2 minutes, and varying the amount of complex reagent (Reagent #4). The test results were used to generate a graph of dosage rate (ppm) versus mg Cd per kg of $P_2O_5$ in the product acid (see, FIGS. 6A-6D). When the dosage rate increases, the Cd removal rate also increases. All tested phosphoric acid solutions exhibit good Cd removal efficiency when the dosage rate was about 250 ppm. At such dosage rate, Reagent #4 can reduce the Cd content to below about 10-20 mg Cd/kg $P_2O_5$.

Example 8

Profile Study of Na Xanthate Reagent

Figure 7A:
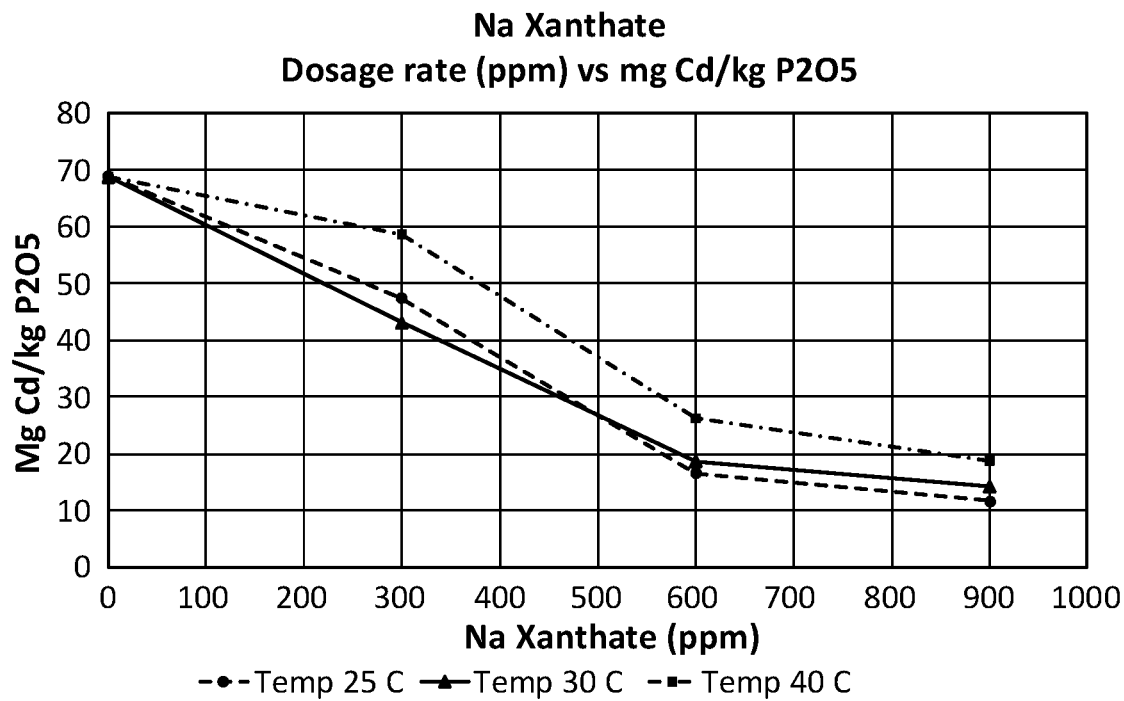
FIGS. 7A-C show plots of the weight of Cadmium (Cd), Arsenic (As), and Copper (Cu), respectively, removed (mg M/kg $P_2O_5$) versus reagent concentration (ppm) when Na Xanthate (sodium isobutyl xanthate) was employed at various temperatures (° C.) for exemplary experiments of the present invention.

This study aims to evaluate the effect of the reagent concentration (i.e., the amounts of the sodium salt of isobutyl xanthate) and acid temperature (i.e., ° C.) in removing Cd from a wet-process phosphoric acid solution. Tests were performed at various reagent concentrations (Na Xanthate, about 300-900 ppm) and acid temperatures (about 25-40° C.) by employing direct injection of diluted reagent solutions into 32% phosphoric acid containing low solids concentrations (e.g., 5%). Solids were removed along with the reagent and portions of the cadmium content using a plate and frame filter. Test results were used to generate a plot of reagent concentration versus mg Cd/kg per kg of $P_2O_5$ in the product acid at the indicated temperatures (see, FIG. 7A and Table 7A). Dosage rates were calculated as ppm concentrations in the feed acid to the filter based on a 100% reagent bases. The Na Xanthate reagent, sodium isobutyl xanthate, contained about 100% of the active ingredient.

TABLE 7A

Reagent Concentration (Na Xanthate) versus mg Cd/kg $P_2O_5$

| | Cd in Treated Acid (mg Cd/kg $P_2O_5$) | | |
|---|---|---|---|
| Na Xanthate (ppm)* | Acid Temp (25° C.) | Acid Temp (30° C.) | Acid Temp (40° C.) |
| 0 | 68.8 | 68.8 | 68.8 |
| 300 | 47.4 | 43.1 | 58.5 |
| 600 | 16.7 | 18.7 | 26.3 |
| 900 | 11.6 | 14.2 | 18.7 |

Figure 7B:
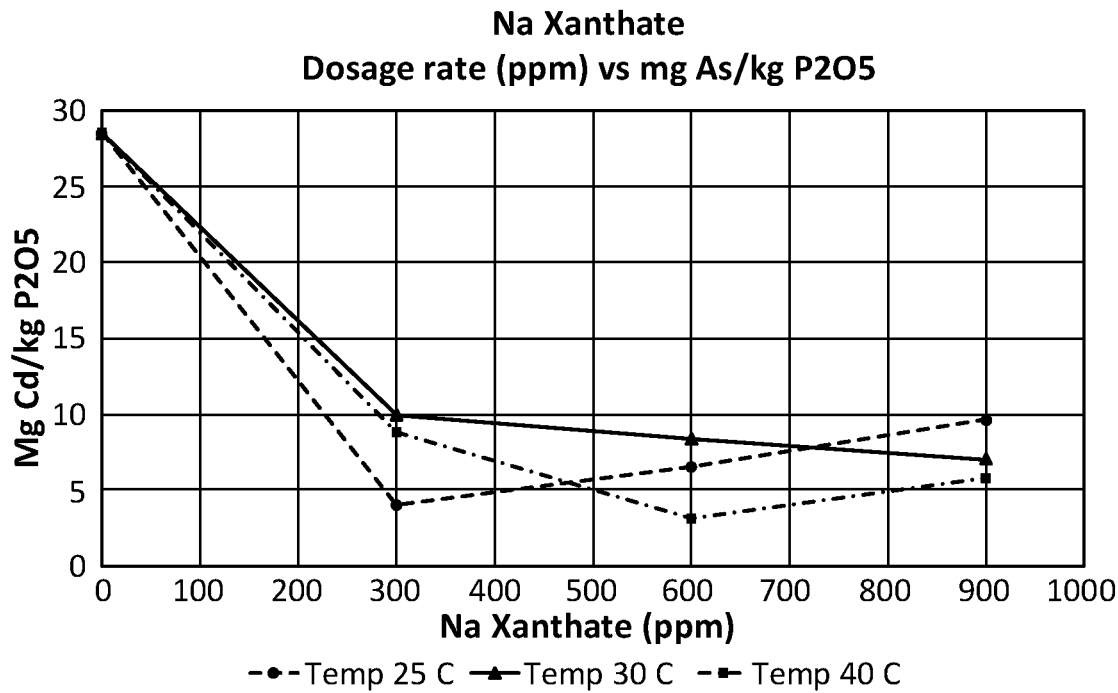
Figure 7C:
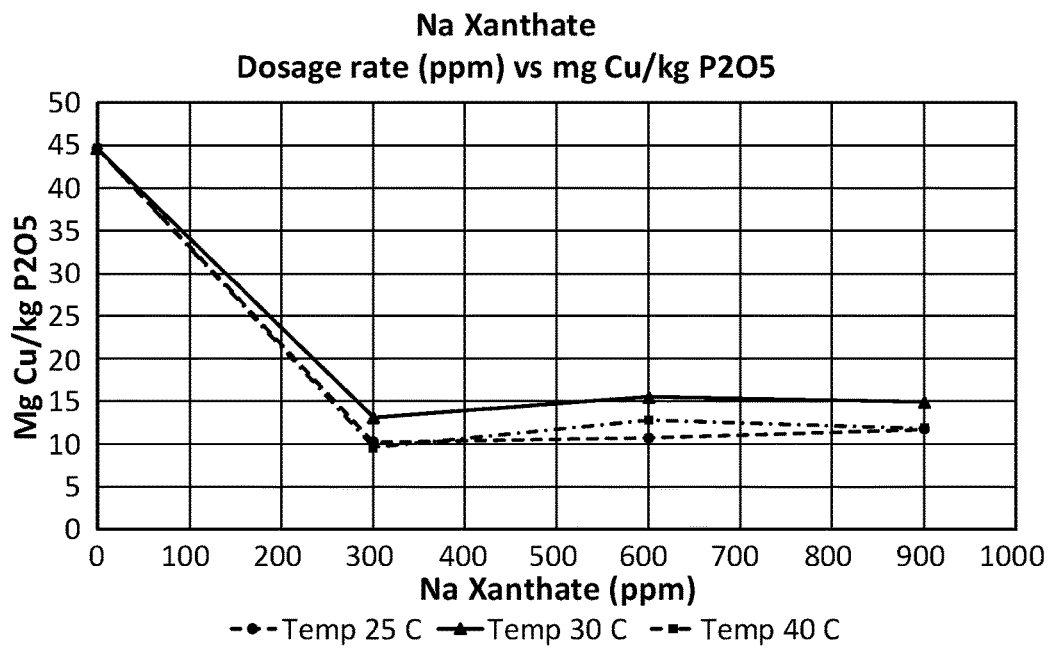

Similar studies were conducted to evaluate the effect of the reagent concentration and acid temperature in removing As and Cu, respectively, from a wet-process phosphoric acid solution (see above, for conditions). Test results were used to generate a plot of reagent concentration versus mg As/kg per kg of $P_2O_5$ (see, FIG. 7B and Table 7B) or mg Cu/kg per kg of $P_2O_5$ (see, FIG. 7C and Table 7C) in the product acid at the indicated temperatures.

TABLE 7B

Reagent Concentration (Na Xanthate) versus mg As/kg $P_2O_5$

| | As in Treated Acid (mg As/kg $P_2O_5$) | | |
|---|---|---|---|
| Na Xanthate (ppm)* | Acid Temp (25° C.) | Acid Temp (30° C.) | Acid Temp (40° C.) |
| 0 | 28.5 | 28.5 | 28.5 |
| 300 | 4 | 10 | 8.8 |
| 600 | 6.5 | 8.4 | 3.1 |
| 900 | 9.6 | 7 | 5.8 |

TABLE 7C

Reagent Concentration (Na Xanthate) versus mg Cu/kg $P_2O_5$

| | Cu in Treated Acid (mg Cu/kg $P_2O_5$) | | |
|---|---|---|---|
| Na Xanthate (ppm)* | Acid Temp (25° C.) | Acid Temp (30° C.) | Acid Temp (40° C.) |
| 0 | 44.7 | 44.7 | 44.7 |
| 300 | 10.3 | 13.2 | 9.6 |

TABLE 7C-continued

Reagent Concentration (Na Xanthate) versus mg Cu/kg P₂O₅

| | Cu in Treated Acid (mg Cu/kg P₂O₅) | | |
|---|---|---|---|
| Na Xanthate (ppm)* | Acid Temp (25° C.) | Acid Temp (30° C.) | Acid Temp (40° C.) |
| 600 | 10.8 | 15.5 | 12.8 |
| 900 | 11.7 | 14.9 | 11.9 |

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

U.S. Provisional Application 63/153,871, filed Feb. 25, 2021, is incorporated herein by reference, in its entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for manufacturing phosphoric acid from a calcium- and heavy metal-containing phosphate ore, consisting essentially of the following steps:
(a) digesting the calcium- and heavy metal-containing phosphate ore with sulfuric acid to give an aqueous mixture of calcium sulfate, phosphoric acid, and heavy metal impurities, wherein the content of calcium sulfate in the aqueous mixture is from about 20 to about 40% weight/weight;
(b) removing the calcium sulfate from the aqueous mixture to give a wet-process phosphoric acid solution containing from about 20 to about 45% weight/weight P₂O₅ and having a pre-treated heavy metal content more than about 10 mg M/kg P₂O₅;
(c) treating the wet-process phosphoric acid solution with from about 100 to about 5000 ppm by weight on a 100% basis of a complex reagent to form a heavy metal complex-contaminated solid adsorbing material, wherein the solid adsorbing material of the heavy metal complex-contaminated solid adsorbing material is calcium sulfate,
wherein the complex reagent has the following structure (I) or (II):

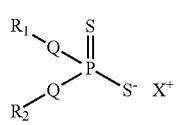

wherein in structure (I)
Q is a bond or O;
R₁ and R₂ are independently H, or a linear or branched C₁₋₄alkyl, wherein at least one of R₁ and R₂ is not H; and
X is H, an alkali metal or ammonium,

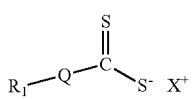

wherein in structure (II)
Q is a bond or O;
R₁ is a linear or branched C₁₋₈ alkyl; and
X is H, an alkali metal or ammonium,
wherein the phosphoric acid solution is maintained during treatment at a temperature between 20-60° C., wherein the temperature is sufficient to allow treatment time to be up to about 90 minutes without significant decomposition of the heavy metal complex, wherein the amount of complex reagent added is sufficient to lower the heavy metal content by at least about 10% at the temperature maintained, and wherein the solid absorbing material is present within the phosphoric acid solution from about 0.5 to about 5% weight/weight and not separately added;
(d) removing the heavy metal complex-contaminated solid adsorbing material from the phosphoric acid solution to yield a treated phosphoric acid solution having a post-treated heavy metal content at least about 10% lower than the pre-treated heavy metal content; and
(e) wherein the treated phosphoric acid solution of step (d) is recirculated in a heat exchange apparatus and used to cool the untreated wet-process phosphoric acid solution in step (c).

2. The method of claim 1, wherein in step (c) all of the steps are performed at about 25-40° C. and the complex reagent is added at a dosage of about 100-2000 ppm.

3. The method of claim 2, wherein in step (c) the complex reagent is added at a dosage of about 100-300 ppm.

4. The method of claim 1, wherein step (c) comprises the steps of: (1) cooling of the wet-process phosphoric acid solution of step (b) to the desired temperature between about 20-60° C. in a heat exchanging apparatus; (2) introducing a complex reagent to form a heavy metal complex-contaminated solid adsorbing material, wherein the solid adsorbing material is present in the phosphoric acid solution; (3) filtering of the wet-process phosphoric acid solution containing the heavy metal complex-contaminated solid adsorbing material, wherein the time it takes to pass substantially all of the wet-process phosphoric acid solution containing the heavy metal complex-contaminated solid adsorbing material through the filter is the treatment time; (4) recovery of the treated phosphoric acid solution of step (d), which is then used in step (e) to cool the feed of the incoming wet-process phosphoric acid solution of step (b), wherein the heat exchange advantageously reheats the phosphoric acid solution of step (d), wherein the phosphoric acid solution of step (d) may then be concentrated; and (4bis) recovery of the heavy metal-contaminated gypsum collected on the filter during step (3).

5. The method of claim 4, wherein step (1) optionally comprises a second heat exchange apparatus.

6. The method of claim 1, wherein in step (c) all of the steps are performed at about 20-50° C.

7. The method of claim 1, wherein in step (c) the wet-process phosphoric acid solution is treated with the complex reagent for at most about 10 minutes.

8. The method of claim 1, wherein in step (c) the wet-process phosphoric acid solution is treated with the complex reagent for a period of time of about 3 seconds, about 10 seconds, about 0.5 to 5 minutes, about 1 to 3 minutes, or about 3 minutes.

9. The method of claim 1, wherein in step (c) the wet-process phosphoric acid solution is maintained at about 20-60° C. and treated for between about 0.05-90 minutes.

10. The method of claim 1, wherein in step (c) all of the steps are performed at about 25° C. and the complex reagent is added at a dosage of about 150 ppm.

11. The method of claim 1, further comprising a step (f) of concentrating the treated phosphoric acid solution of step (d) to give a concentrated acid solution having from about 40% to about 54% weight/weight $P_2O_5$.

12. The method of claim 1, wherein in step (c) the wet-process phosphoric acid solution is treated with from about 150 to about 500 ppm by weight on a 100% basis of the complex reagent.

13. The method of claim 1, wherein the post-treated heavy metal content is at least about 98% lower than the pre-treated heavy metal content.

14. The method of claim 1, wherein the treated phosphoric acid solution contains less than about 20 mg M/kg $P_2O_5$.

15. The method of claim 1, wherein the treated phosphoric acid solution contains less than about 10 mg M/kg $P_2O_5$.

16. The method of claim 1, wherein the heavy metal "M" is cadmium "Cd".

17. The method of claim 1, wherein the heavy metal "M" is arsenic "As".

18. The method of claim 1, wherein the heavy metal "M" is copper "Cu".

19. The method of claim 1, wherein in step (c) the wet-process phosphoric acid solution is treated with from about 300 to about 500 ppm by weight on a 100% basis of the complex reagent, and wherein the complex reagent is an ammonium, sodium, or potassium salt of di-isobutyl dithiophosphinate of structure (I).

20. The method of claim 1, wherein in step (c) the wet-process phosphoric acid solution is treated with from about 300 to about 500 ppm by weight on a 100% basis of the complex reagent, and wherein the complex reagent is an ammonium, sodium, or potassium salt of di-isobutyl dithiophosphate of structure (I).

21. The method of claim 1, wherein in step (c) the wet-process phosphoric acid solution is treated with from about 100 to about 1500 ppm by weight on a 100% basis of the complex reagent, and wherein the complex reagent is an ammonium, sodium, or potassium salt of isobutyl xanthate of structure (II).

22. The method of claim 1, wherein in step (c) the phosphoric acid solution is maintained during treatment at a temperature between 20-60° C. and treated for about 0.05 to about 180 minutes, wherein the maximum treatment time "Y" is inversely proportional to the temperature "X" according to the formula $Y=0.12X^2-17X+600$, +/−35%, up to about 180 minutes.

23. The method of claim 1 wherein in step (d) removing the heavy metal complex-contaminated solid adsorbing material from the phosphoric acid solution yields a treated phosphoric acid solution having a post-treated cadmium content at least 80% lower than the pre-treated cadmium content.

24. The method of claim 1 wherein in step (d) removing the heavy metal complex-contaminated solid adsorbing material from the phosphoric acid solution yields a treated phosphoric acid solution having a post-treated cadmium content at least 90% lower than the pre-treated cadmium content.

25. The method of claim 1 wherein in step (d) removing the heavy metal complex-contaminated solid adsorbing material from the phosphoric acid solution yields a treated phosphoric acid solution having a post-treated cadmium content at least 95% lower than the pre-treated cadmium content.

26. A method for manufacturing phosphoric acid from a calcium- and cadmium-containing phosphate ore, consisting essentially of the following steps:
  (a) digesting the calcium- and cadmium-containing phosphate ore with sulfuric acid to give an aqueous mixture of calcium sulfate, phosphoric acid, and cadmium impurities, wherein the content of calcium sulfate in the aqueous mixture is from about 20 to about 40% weight/weight;
  (b) removing the calcium sulfate from the aqueous mixture to give a wet-process phosphoric acid solution containing from about 20 to about 45% weight/weight $P_2O_5$ and having a pre-treated cadmium content of about 50-90 mg Cd/kg $P_2O_5$ "Z";
  (c) treating the wet-process phosphoric acid solution with from about 100 to about 1500 ppm by weight on a 100% basis of a complex reagent, wherein the complex reagent is a di-lower alkyl dithiophosphinate salt or di-lower alkyl dithiophosphate salt, to form a cadmium complex-contaminated solid adsorbing material, wherein the solid adsorbing material of the heavy metal complex-contaminated solid adsorbing material is calcium sulfate,
  wherein the solid absorbing material is present within the phosphoric acid solution from about 0.5 to about 5% weight/weight and not separately added, and wherein the phosphoric acid solution is maintained during treatment at a temperature between 20-60° C. for up to about 90 minutes, such that about Y ppm of the reagent is added when the temperature of the phosphoric acid solution is about X° C. according to the formula $Y=((Z-50)*5)+ (0.55X^2-23.8X+388)$, +/−35%; and
  (d) removing the cadmium complex-contaminated solid adsorbing material from the phosphoric acid solution to yield a treated phosphoric acid solution having a post-treated cadmium content at least about 10% lower than the pre-treated cadmium content.

27. The method of claim 26, wherein in step (c) all of the steps are performed at about 20-40° C.

28. The method of claim 26 wherein in step (d) removing the cadmium complex-contaminated solid adsorbing material from the phosphoric acid solution yields a treated phosphoric acid solution having a post-treated cadmium content at least 80% lower than the pre-treated cadmium content.

29. The method of claim 26 wherein in step (d) removing the cadmium complex-contaminated solid adsorbing material from the phosphoric acid solution yields a treated phosphoric acid solution having a post-treated cadmium content at least 90% lower than the pre-treated cadmium content.

30. The method of claim 26 wherein in step (d) removing the cadmium complex-contaminated solid adsorbing material from the phosphoric acid solution yields a treated phosphoric acid solution having a post-treated cadmium content at least 95% lower than the pre-treated cadmium content.

\* \* \* \* \*